(12) United States Patent
Labrot

(10) Patent No.: US 11,167,530 B2
(45) Date of Patent: Nov. 9, 2021

(54) LAMINATED VEHICLE GLAZING WITH AMOLED SCREEN

(71) Applicant: SAINT-GOBAIN GLASS FRANCE, Courbevoie (FR)

(72) Inventor: Michael Labrot, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 575 days.

(21) Appl. No.: 16/067,310

(22) PCT Filed: Dec. 22, 2016

(86) PCT No.: PCT/FR2016/053635
§ 371 (c)(1),
(2) Date: Jun. 29, 2018

(87) PCT Pub. No.: WO2017/115038
PCT Pub. Date: Jul. 6, 2017

(65) Prior Publication Data
US 2019/0009502 A1 Jan. 10, 2019

(30) Foreign Application Priority Data

Dec. 30, 2015 (FR) ...................................... 1563466

(51) Int. Cl.
*B32B 17/10* (2006.01)
*B60R 11/02* (2006.01)
(52) U.S. Cl.
CPC .. *B32B 17/10036* (2013.01); *B32B 17/10348* (2013.01); *B32B 17/10541* (2013.01); *B32B 17/10568* (2013.01); *B60R 11/0235* (2013.01); *B32B 2457/20* (2013.01); *B32B 2457/206* (2013.01); *B32B 2605/006* (2013.01); *B60R 2300/20* (2013.01)

(58) Field of Classification Search
CPC ......................... B60R 1/081; B60R 2300/108
See application file for complete search history.

(56) References Cited

U.S. PATENT DOCUMENTS 4,943,484 A * 7/1990 Goodman ........... C03C 17/3642
428/441
2009/0039901 A1 2/2009 Delatte et al.
(Continued)

FOREIGN PATENT DOCUMENTS

CN 202503691 U 10/2012
CN 202806307 U 3/2013
(Continued)

OTHER PUBLICATIONS

First Office Action as issued in Chinese Patent Application No. 201680004767.9, dated Sep. 26, 2018.
(Continued)

*Primary Examiner* — Ramsey Zacharia
(74) *Attorney, Agent, or Firm* — Pillsbury Winthrop Shaw Pittman LLP

(57) ABSTRACT

A laminated vehicle glazing includes an AMOLED screen between the internal faces of the glazings and which is located in a visual comfort zone, and is alone or adjacent with another or several other flexible AMOLED screens also clustered in the visual comfort zone.

23 Claims, 11 Drawing Sheets

(56) References Cited

U.S. PATENT DOCUMENTS

| | | | |
|---|---|---|---|
| 2011/0025584 A1* | 2/2011 | Nishigasako | B32B 17/10036 345/76 |
| 2011/0157732 A1* | 6/2011 | Henion | B60R 1/081 359/864 |
| 2013/0004719 A1* | 1/2013 | Thellier | B32B 17/10568 428/157 |
| 2014/0203703 A1 | 7/2014 | Maatta | |
| 2016/0159282 A1* | 6/2016 | Kurihara | B32B 17/10541 348/148 |

FOREIGN PATENT DOCUMENTS

| | | |
|---|---|---|
| CN | 203293862 U | 11/2013 |
| DE | 10 2008 004049 A1 | 7/2009 |
| EP | 1 437 215 A1 | 7/2004 |
| EP | 2 955 064 A1 | 12/2015 |
| WO | WO 2004/025334 A2 | 3/2004 |
| WO | WO 2010/136702 A1 | 12/2010 |
| WO | WO 2015/041106 A1 | 3/2015 |

OTHER PUBLICATIONS

International Search Report as issued in International Patent Application No. PCT/FR2016/053635, dated Mar. 6, 2017.
Second Office Action as issued in Chinese Patent Application No. 201680004767.9, dated Jul. 18, 2019.
Second Office Action as issued in Chinese Patent Application No. 201680004766.4, dated Jun. 19, 2019.
Second Office Action as issued in Chinese Patent Application No. 201680004793.1, dated Jun. 17, 2019.
Final Office Action as issued in U.S. Appl. No. 16/067,470, dated Apr. 20, 2021.

* cited by examiner

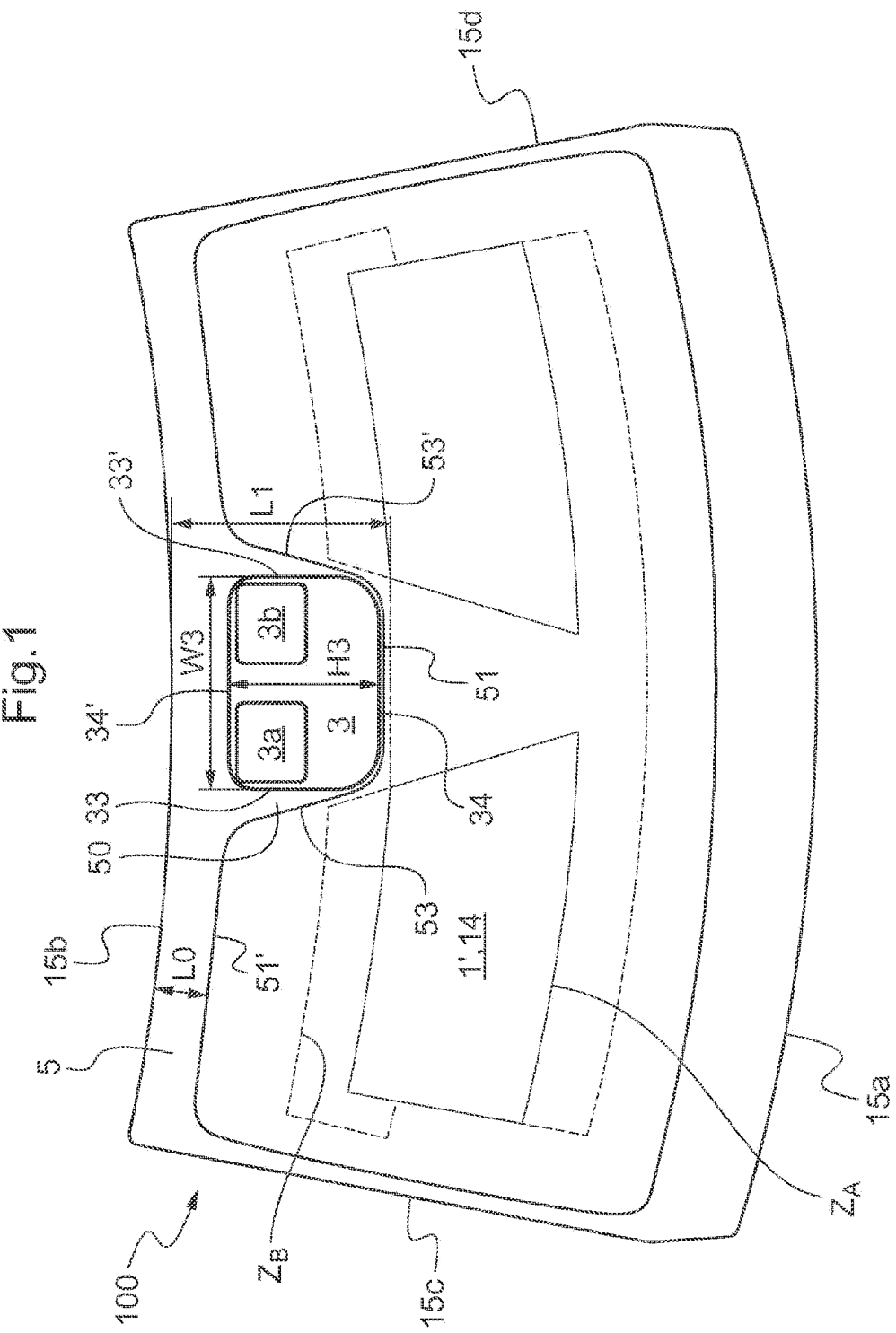

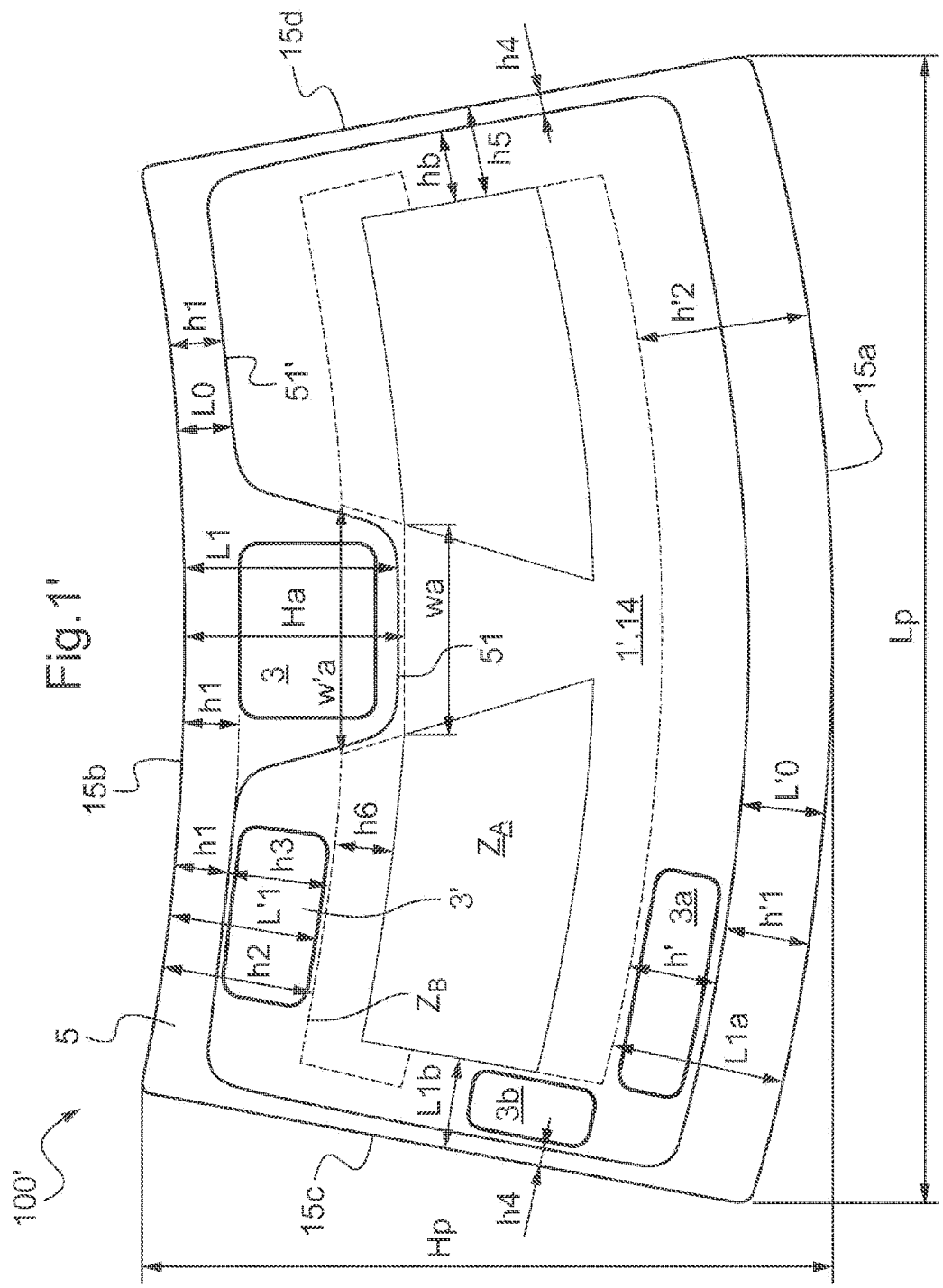

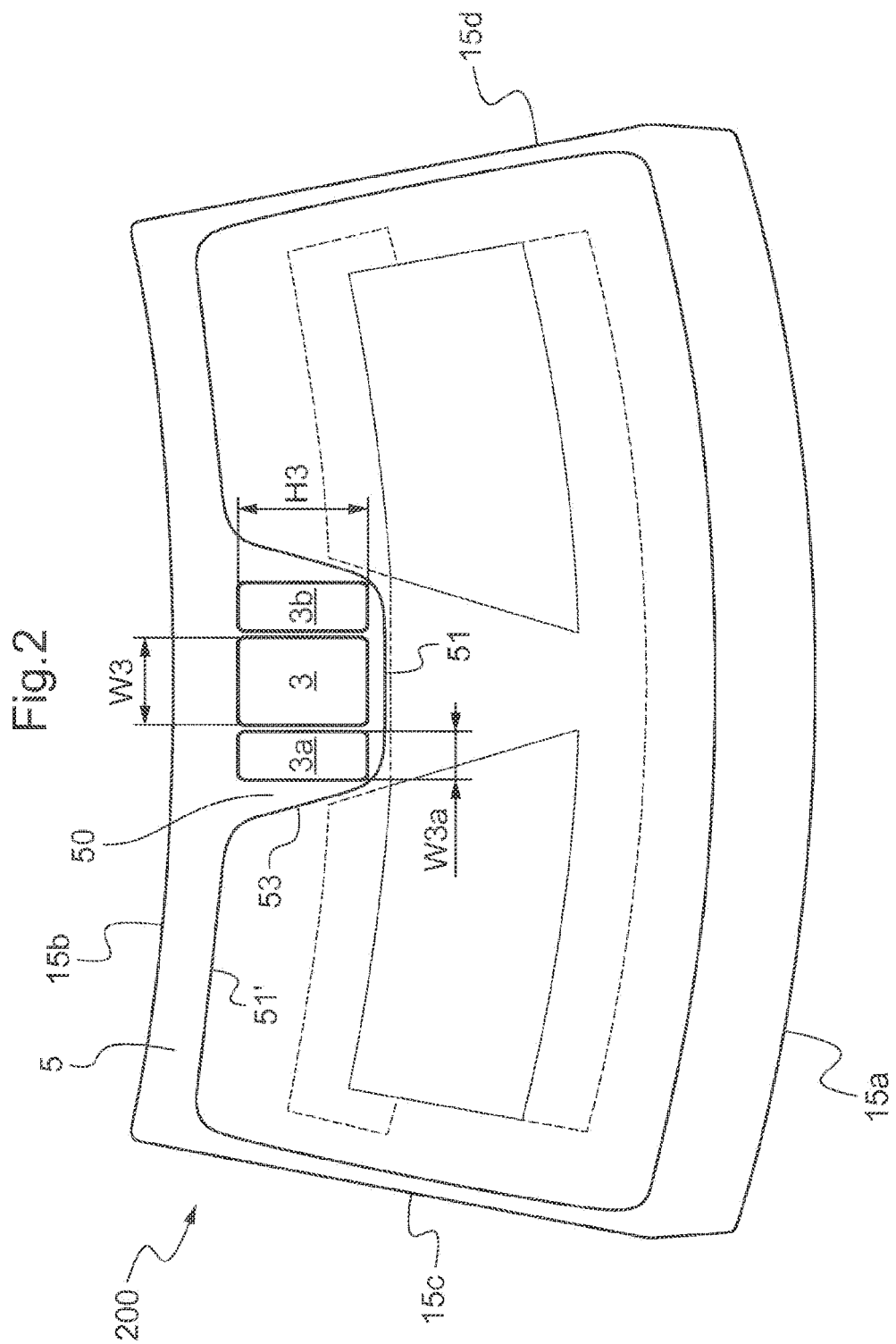

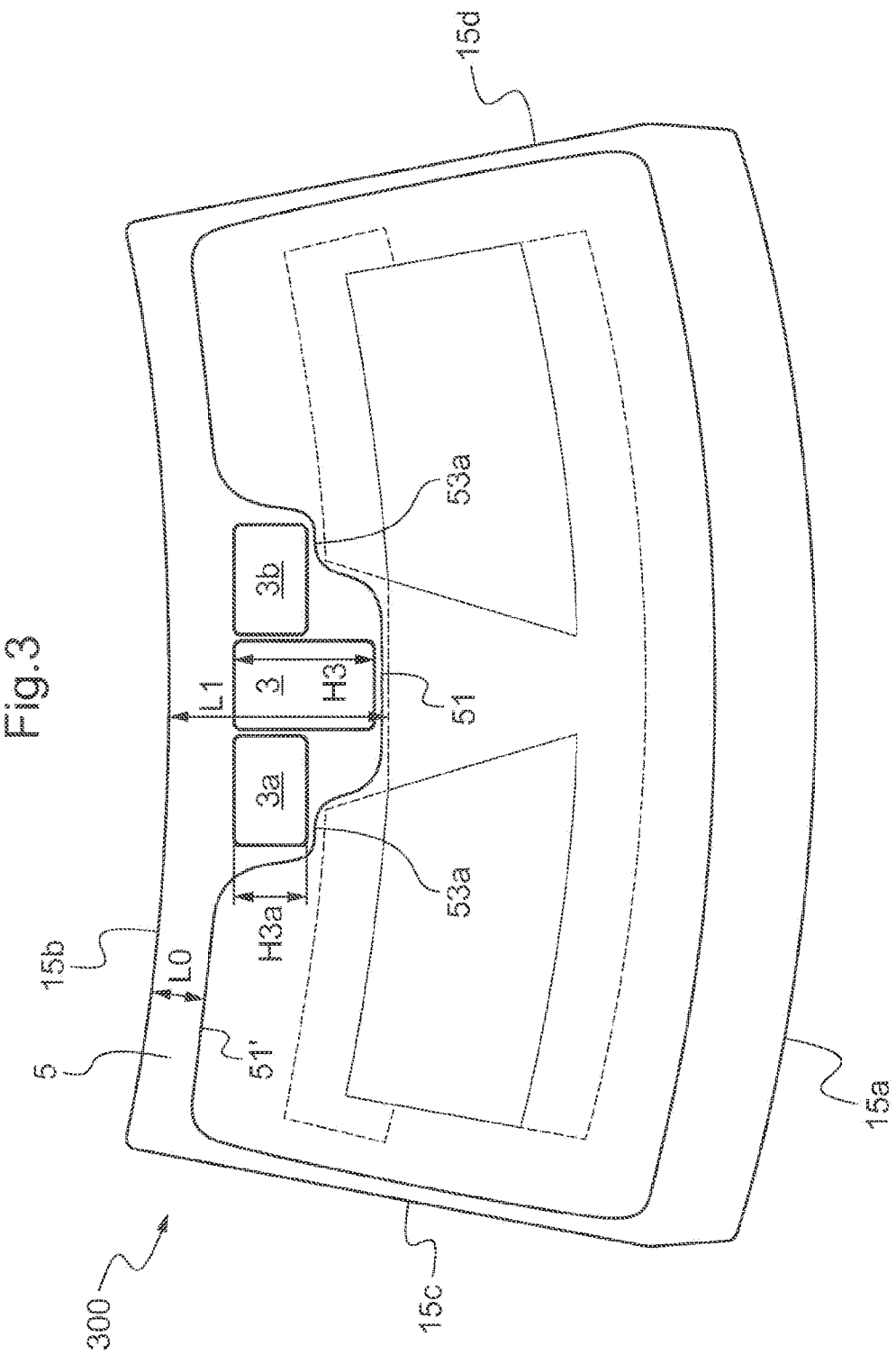

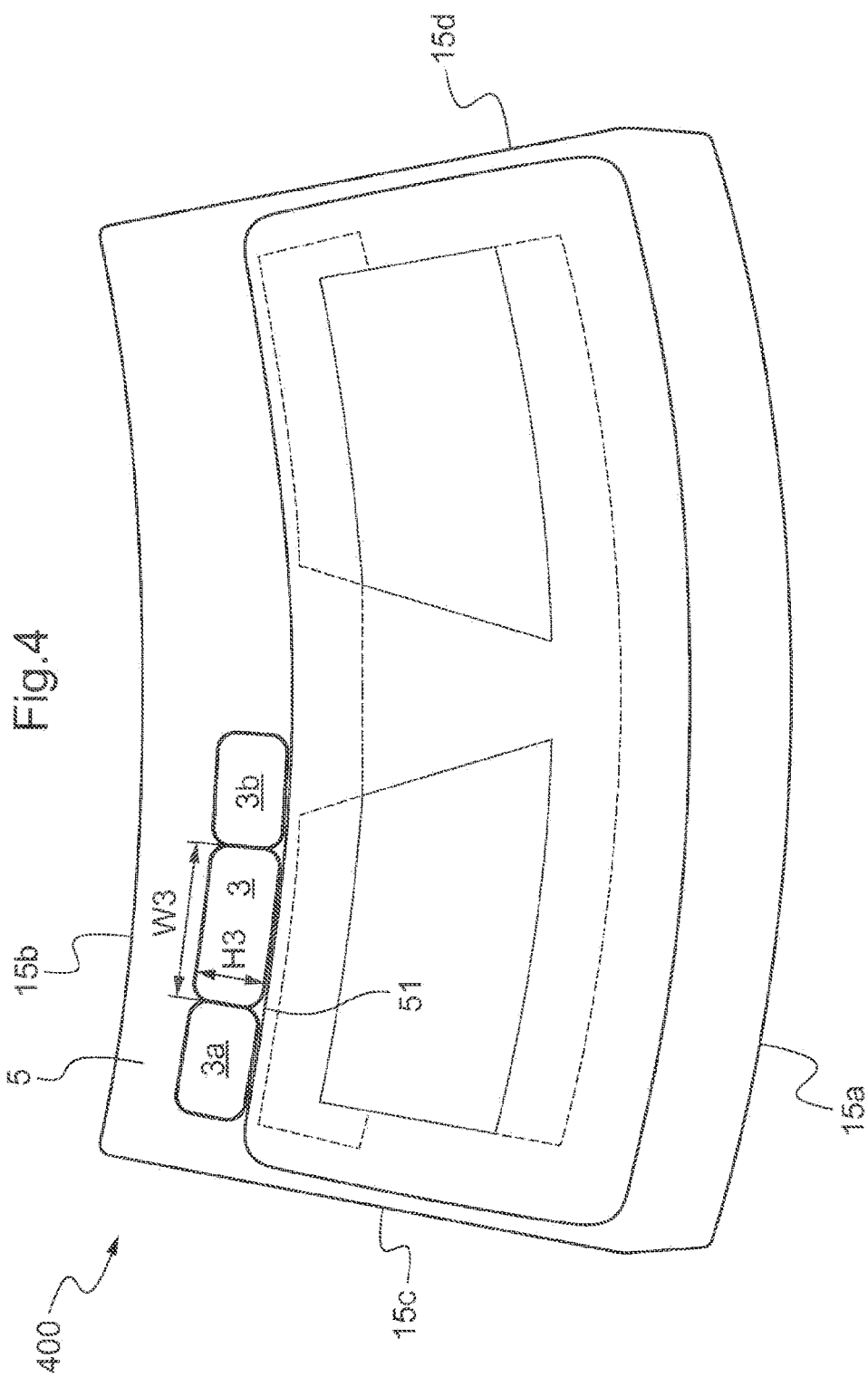

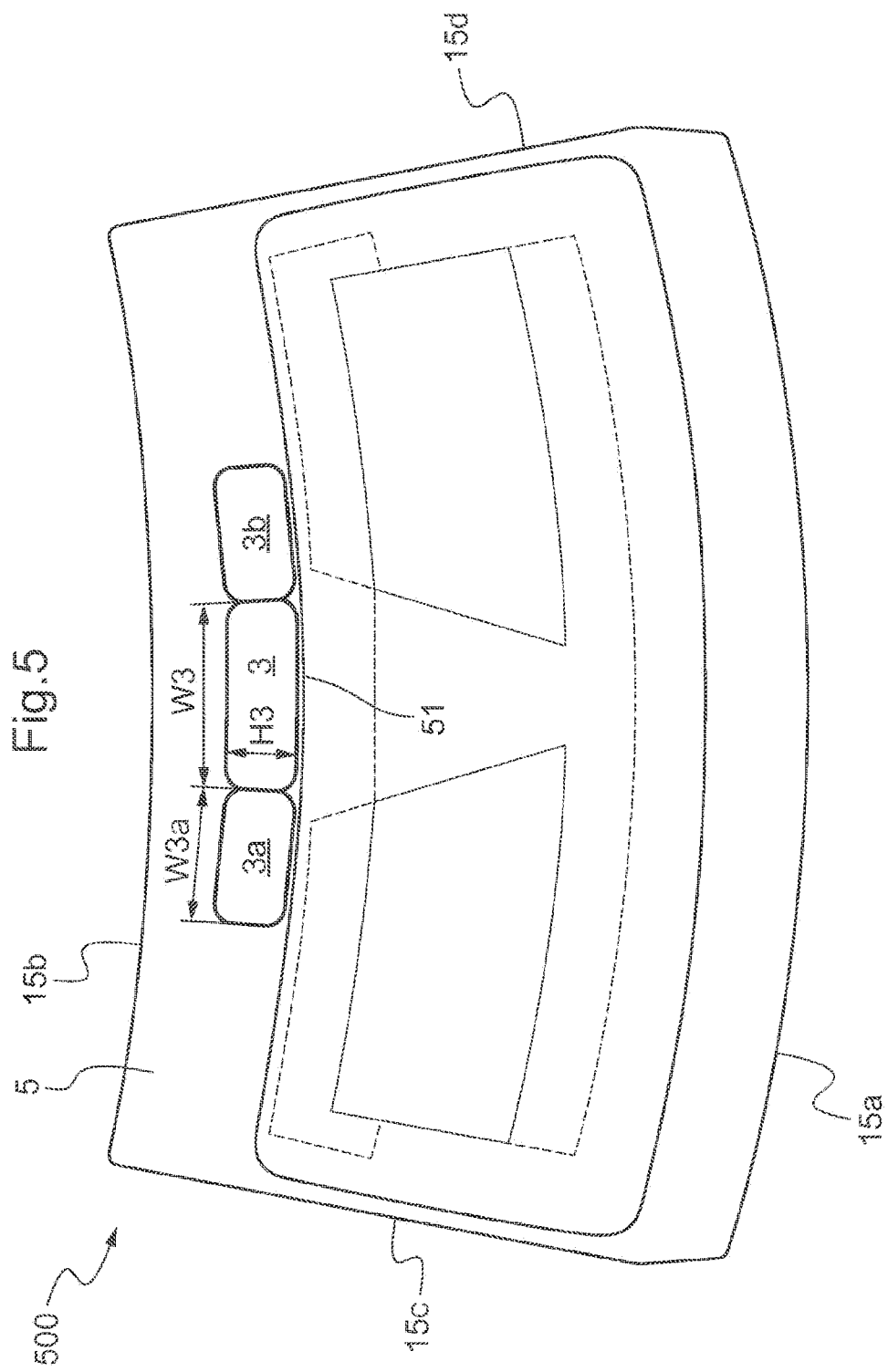

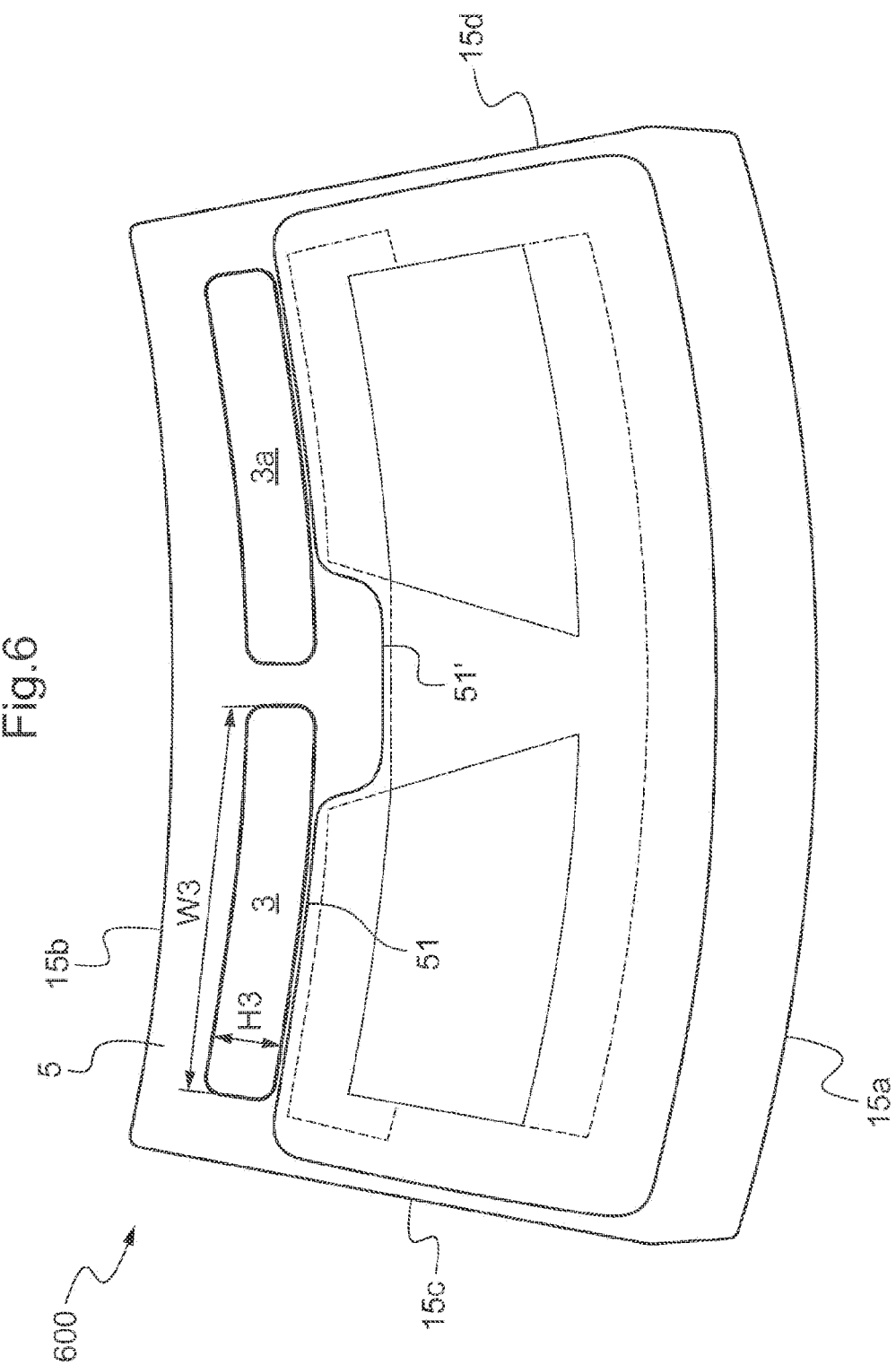

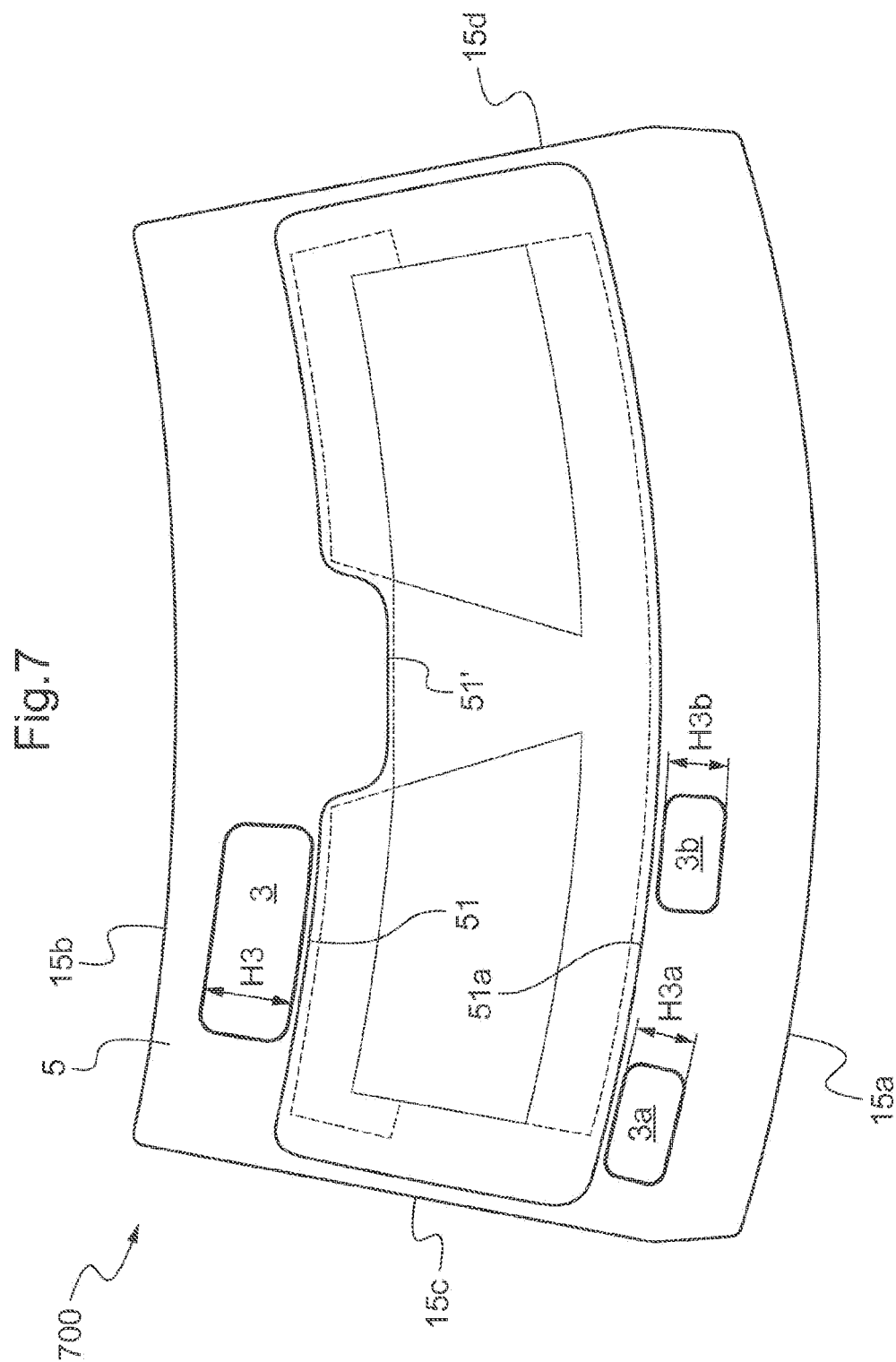

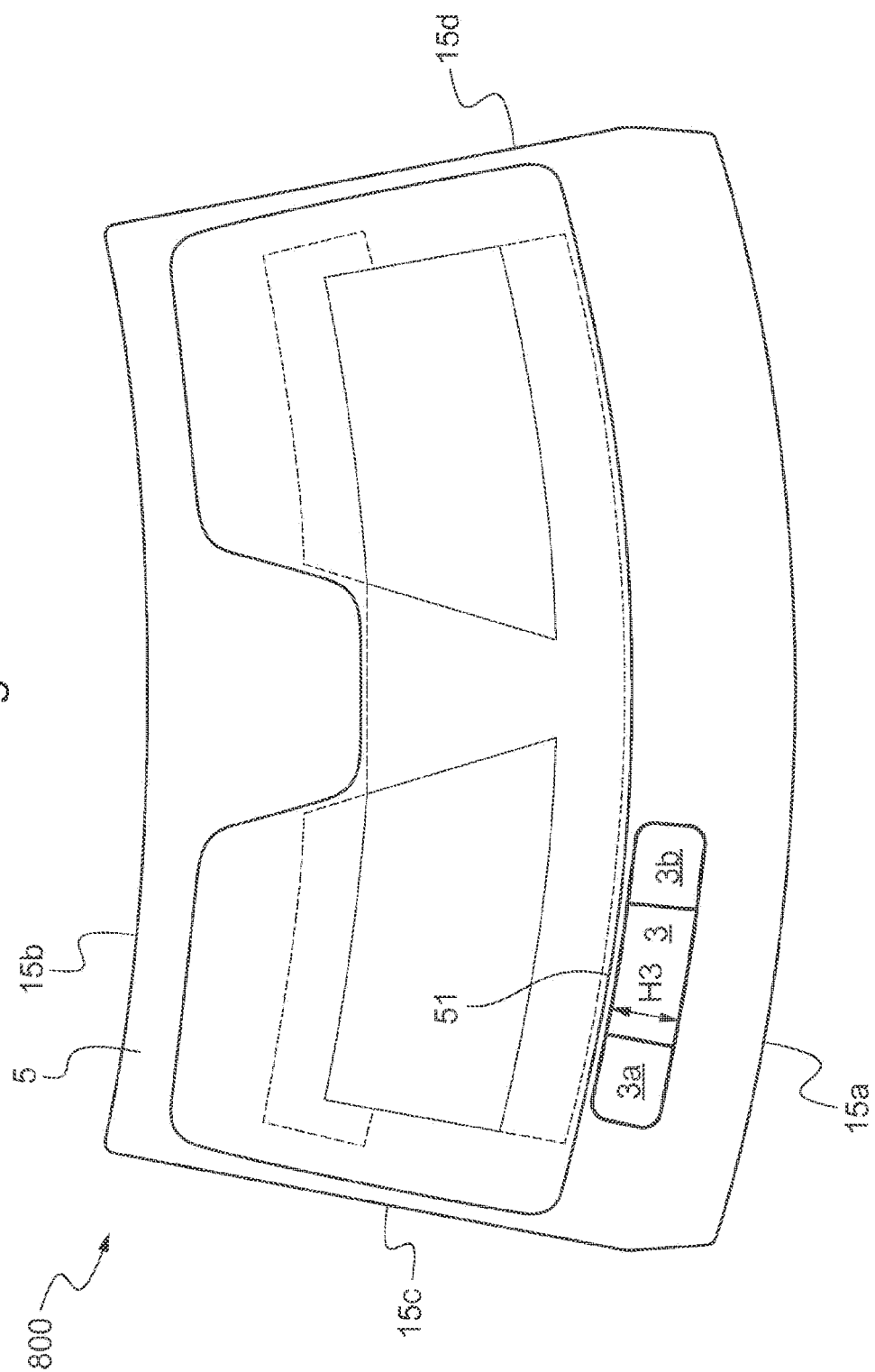

1

LAMINATED VEHICLE GLAZING WITH AMOLED SCREEN

CROSS-REFERENCE TO RELATED APPLICATIONS

This application is the U.S. National Stage of PCT/FR2016/053635, filed Dec. 22, 2016, which in turn claims priority to French patent application number 1563466 filed Dec. 30, 2015. The content of these applications are incorporated herein by reference in their entireties.

The invention relates to a laminated vehicle glazing and more particularly a laminated vehicle glazing integrating an AMOLED screen.

An ever greater number of intelligent windshields exist which deliver information to the driver.

Document WO2015041106 proposes in particular an automobile windshield comprising an AMOLED (Active Matrix Organic Light Emitting Diode) screen—between the internal faces of the two glazings, screen arranged peripherally and masked in the enameled boundary on face F2 that is to say the internal face of the outermost glazing. The horizontally positioned AMOLED screen is aimed at replacing the internal rear view mirror to see the rear of the vehicle -conventionally in the form of a mirror—and is preferentially situated in the central part along the top longitudinal edge of the windshield. It is coupled with cameras at the rear of the vehicle.

A second AMOLED screen, positioned vertically, is aimed at replacing the left lateral rear view mirror to see a car on the left side of the vehicle and is situated in the bottom part along the left lateral edge of the windshield and masked by a layer on the internal face of the external glazing, made of enamel.

A third AMOLED screen, positioned vertically, is aimed at replacing the right lateral rear view mirror is situated in the bottom part along the right lateral edge of the windshield and masked by a layer on the internal face of the external glazing, made of enamel.

The aim of the invention is to improve this laminated vehicle glazing with AMOLED screen notably windshield with AMOLED screen.

For this purpose, the subject of the present invention is a laminated vehicle glazing notably windshield or lateral glazing of a vehicle notably a road vehicle, comprising:
  a first glazing, preferably cambered, preferably of mineral glass, preferably tinted, notably gray or green, with a first main face termed F1 intended to be on the outside of the vehicle and a second opposite main face termed F2, glazing of thickness E1 preferably (especially in the road sector, for an automobile) of at most 2.5 mm, even of at most 2 mm—notably 1.9 mm, 1.8 mm, 1.6 mm and 1.4 mm—or even of at most 1.3 mm or of at most 1 mm,
  a lamination interlayer of polymeric substance (clear, extraclear), preferably thermoplastic, on the face F2 side, of (total) thickness E2 preferably especially in the road sector, for an automobile) of at most 2.2 mm better of at most 2 mm, of at most 1.5 mm or even of at most 0.76 mm, for example composed of several plies for example 3 plies, notably set back from the lip of the second glazing (by at most 5 mm or even by at most 2 mm or by at most 1 mm)
  a second glazing, preferably cambered (like the first glazing), preferably of mineral glass, with a third main face termed F3 on the lamination interlayer side and a fourth opposite main face termed F4, notably intended to be on the inside of the vehicle, optionally tinted (or clear and even with an electroconducting layer on face F3 or even F4), of thickness E'1 preferably less than E1, even of at most 2.2 mm (especially in the road sector, for an automobile)—notably 1.9 mm, 1.8 mm, 1.6 mm and 1.4 mm—or even of at most 1.3 mm or of at most 1 mm, the total thickness of the glazings E1+E'1 being preferably (especially in the road sector, for an automobile) strictly less than 4.4 mm, even than 3.7 mm, one at least—and better both—of the first and second glazings being made of glass, the other optionally of organic, polymeric substance such as a polycarbonate,
  between the face F2 and the face F3, a first organic light-emitting diode-based viewing screen termed a flexible AMOLED screen 3, comprising a set of pixels, the first AMOLED screen comprising a (central) zone of dynamic information display, —the AMOLED screen comprising a first flexible support (preferably polymeric substance, or glass, or indeed even metal) bearing organic light-emitting system(s) between two electrodes—and AMOLED screen of thickness E3 less than E2 preferably subcentimetric and even of at most 0.5 mm, AMOLED screen having a front main face oriented toward F3 and a rear main face oriented toward F2, —the AMOLED screen being covered by a non-zero thickness of lamination interlayer—and preferably within the lamination interlayer—therefore with a non-zero thickness E21 of lamination interlayer between the rear face and F2 and/or with a non-zero thickness E22 between the front face and F3, E2 corresponding to the thickness on the side of the AMOLED screen (notably E2 >than E21+E22 and substantially equal to E3), the AMOLED screen is notably arranged peripherally,
  preferably an electrical connection element 4 of the AMOLED screen, with a so-called connecting part between the face F2 and the face F3, of thickness E4 less than E2 and preferably subcentimetric, with a front surface on the face F3 side and a rear surface on the face F2 side, connecting part covered by a non-zero thickness of lamination interlayer and even preferably connecting part within the lamination interlayer (like the AMOLED screen) with a non-zero thickness E41 of lamination interlayer between the rear surface and the face F2 and with a non-zero thickness E42 (preferably identical to the thickness E3) between the front surface and the face F3).

The connecting part is linked (preferably permanent link) to the AMOLED screen and extends (directly) the AMOLED screen in the direction of the lip of the second glazing, and the flexible electrical connection element extending outside of the lip of the second glazing (via a so-called exterior part).

The connection element in particular is for the power supply and (preferably)/or transporting data signals (simultaneously or sequentially) in particular electrical connection element comprising one or more power supply tracks (or "supply lines") and/or one or more tracks for the data signals (or "data lines"), and electronic components (optionally in particular in the connecting part).

The AMOLED screen according to the invention is flexible and is located in a so-called visual comfort zone, and is alone or adjacent with another or several other flexible AMOLED screens between the face F2 and the face F3 (organic light-emitting diode-based viewing screen(s), comprising a set of pixels, each of thickness E3 less than E2 and preferably subcentimetric, and comprising a zone of dynamic information display), other AMOLED screen(s) clustered in said visual comfort zone and covered by a non-zero thickness of lamination interlayer and preferably within the lamination interlayer.

The AMOLED screen alone or with said other AMOLED screens is able to display a plurality of items of information dynamically notably independently of one another, in particular at one and the same time the lateral view of the vehicle on the left side (far left of the glazing) and of the rear of the vehicle (the most central) and even lateral view of the vehicle on the right side of the vehicle (far right of the glazing).

The grouping of information zone and even of AMOLED screens in a visual comfort zone is more ergonomic. The invention is very particularly advantageous in respect of a windshield, preferably of a road vehicle (automotive, truck).

On the driver's side, the items of information are preferably driving aids and they are in the field of vision of the driver who does not have to turn their head (too much) (even for right lateral vision if the driver is on the left side and vice versa) this being liable to lead to accidents, in particular:
  opposite the driver
  and/or in the central zone.

One or more cameras at the rear of the vehicle and/or on the sides of the vehicle can aid the formation of panoramic vision (wider overall view) or at least with no dead angle on the lone AMOLED screen or with two other AMOLED screens on either side.

On the passenger's side, the items of information are preferably on the environment or entertainment (TV, cinema, telephone mode) and they are in the field of vision of the copilot who does not have to turn their head (too much) in particular opposite the copilot.

The clustering of several AMOLED screens can also simplify their power supply, exchanges of data between them or with the exterior. There is a preference for one, two or indeed and three AMOLED screens at most per visual comfort zone so that they are of suitable size. They can be spaced apart (for example by at most 10 cm or 5 cm) or adjoining and even linked together (by their sides in the zone of the lamination) notably before mutual lamination. Each may have one or more electrical connection elements preferably on one and the same edge.

The AMOLED screen (with display zone masked or not at the rear) arranged horizontally (along the lower or upper longitudinal edge) may be more than 150 mm in width (horizontal dimension).

The AMOLED screen (with display zone masked or not at the rear) may be arranged vertically in a central position of the preferably upper longitudinal edge. The same holds for other AMOLED screens in a central position, it is possible to add the widths accordingly.

Preferably, the AMOLED screen (fairly transparent) is furthermore in the clear window region or the AMOLED screen is masked by an, opaque, so-called external peripheral masking layer between the face F2 and the rear face of the AMOLED screen (preferably on face F2 and an enamel layer) and the connecting part is also optionally masked by the external masking layer (even when the AMOLED screen is in the clear window region, the connecting part can preferably be masked by the external masking layer).

In the present invention, in the absence of indications, the term transparent AMOLED screen comprises two situations:

In the first, the luminous transmission LT of the zone of the laminated glazing (of the automotive windshield, preferably and even of a road vehicle) comprising the AMOLED screen is less than 70%, notably at most equal to 10% (colored . . . ) and even at most equal to 5% and greater than 0%, this being because the AMOLED screen allows little light to pass through. In this situation, the AMOLED screen is placed in an acceptable peripheral zone (detailed later) and the display zone is preferably masked (via the rear) by a so-called external masking layer (detailed later).

In the second, the luminous transmission LT of the zone of the laminated glazing (of the automotive windshield, preferably and even of a road vehicle) comprising the AMOLED screen is at least equal to 70% and preferably the haze in this zone of the laminated glazing comprising it is at most 2% and even at most 1% or else less than 1%, or less than 0.5%. Therefore the AMOLED screen is sufficiently transparent to be placed in the clear window region, in the central zone (restricted zone B, even zone A). It can equally well be placed in a more peripheral (potentially opaque) zone without requiring masking (via the rear) of the display zone by a so-called external masking layer (detailed later).

If the screen is opaque, the luminous transmission LT of the zone of the laminated glazing (of the automotive windshield, preferably and even of a road vehicle) comprising the AMOLED screen is even equal to 0% (opaque zone). In this situation, the AMOLED screen is placed in an acceptable peripheral zone (detailed later) and the display zone is preferably masked (via the rear) by a so-called external masking layer (detailed later).

The visual comfort zone can be peripheral and situated between a lateral edge of the glazing (automotive, road vehicle windshield) and the central zone of the glazing, the AMOLED screen and arranged horizontally and preferably of length W3 of at least 100 mm and even of at least 120 mm or else greater than 150 mm, along the preferably upper longitudinal edge. In particular, the AMOLED screen is masked by said so-called external masking layer or the AMOLED screen (and the other one or the other two AMOLED screens) are fairly transparent so as to be placed freely preferably in a fairly peripheral zone (away from zone A).

In one configuration, the glazing comprises three AMOLED screens in the visual comfort zone, and said AMOLED screen is for the view of the rear and the other two AMOLED screens are on either side of the AMOLED screen are for the lateral views of the vehicle. It is thus possible not only to see the rear of the vehicle but also the cars in one or more other lanes (and/or the pavement, a motorway guardrail, the walls of a garage, of a car park . . . etc).

The AMOLED screen can be arranged horizontally along the preferably upper longitudinal edge of the glazing (automotive, road vehicle windshield); on the driver's side or copilot's side:
  the AMOLED screen is alone in the visual comfort zone and preferably of length W3 of at least 100 mm and even of at least 120 mm again at least, notably serves for the view of the rear and for the lateral views of the vehicle
  or is adjacent, preferably the longest, to the one or two of said other AMOLED screens arranged horizontally optionally of smaller size than the AMOLED screen, for example the longest AMOLED screen is for the (central) view of the rear and two other AMOLED screens on either side are for the lateral views of the vehicle (left and right).

In particular, the AMOLED screen (and the other one or the other two AMOLED screens) is masked by said so-called external masking layer (and in a peripheral zone) or the AMOLED screen (and the other one or the other two AMOLED screens) are fairly transparent so as to be placed freely preferably in a fairly peripheral zone (away from zone A).

In one embodiment:
the AMOLED screen is arranged alone horizontally along the lower longitudinal edge of the glazing (of the, automotive, road vehicle windshield), on the driver's side (visual comfort zone) preferably of length of at least 100 mm and even at least 120 mm, or else more than 150 mm, notably serves for the (central) view of the rear and for the lateral views of the vehicle or one or two other AMOLED screens are arranged horizontally along the lower longitudinal edge of the glazing (of the, automotive, road vehicle windshield) on the driver's side preferably of length of at least 60 mm and even at least 80 mm or 100 mm, and the AMOLED screen is (alone) arranged horizontally along the upper longitudinal edge of the glazing (of the, automotive, road vehicle windshield), notably is for the (central) view of the rear, and the other two AMOLED screens are for the lateral views (left and right) of the vehicle, notably the other AMOLED screen or screens are offset laterally (offset along the horizontal) of the AMOLED screen therefore on either side of the AMOLED screen (the longest being preferably, of a length of at least 120 mm and even more than 150 mm).

In particular, the AMOLED screen (and the other one or the other two AMOLED screens) is masked by said so-called external masking layer, or the AMOLED screen (and the other one or the other two AMOLED screens) are fairly transparent so as to be placed freely preferably in a fairly peripheral zone (away from zone A).

In one embodiment:
the visual comfort zone is peripheral and situated in the central zone of the upper longitudinal edge of the glazing (of the, automotive, road vehicle windshield), the AMOLED screen is preferably masked by a so-called external masking layer on face F2 in a zone with the external masking layer, preferably wider, (vertical dimension), and:
the AMOLED screen is the only one in the visual comfort zone arranged horizontally and preferably of length W3 of at least 100 mm and even of at least 120 mm and even more than of 150 mm, notably serves for the view of the rear and also for one or the lateral views of the vehicle or the AMOLED screen is adjacent, notably the most central and/or longest, to one or two other of said AMOLED screens arranged horizontally, optionally of smaller sizes (at least for the height H which is the vertical dimension), notably the AMOLED screen serves for the view of the rear and the other two AMOLED screens on either side for the lateral views of the vehicle.

In one embodiment, the visual comfort zone is peripheral and situated in the central zone of the upper longitudinal edge of the glazing, the AMOLED screen is preferably masked by a so-called external masking layer on face F2 in a zone with the external masking layer, preferably wider and
the AMOLED screen, with notably a part of its surface in the overwidth (lower), and said other AMOLED screen is arranged horizontally with a smaller height H3 than the height of the AMOLED screen, and even two of said other AMOLED screens are on either side of the AMOLED screen preferably arranged horizontally notably for the lateral views of the vehicle, or the AMOLED screen, notably for the view of the rear, is arranged vertically, with notably a part of its surface in the overwidth with another AMOLED screen arranged vertically with a height less than or equal to the height H3 of the AMOLED screen, and even two other AMOLED screens on either side of the AMOLED screen preferably arranged vertically notably for the lateral views of the vehicle.

Preferably, the laminated glazing comprises a so-called external masking layer, preferably of enamel, on face F2 behind the AMOLED screen and the optional other AMOLED screen or screens.

In the off state, the AMOLED screen zone might not be distinguishable from the masking zone further to the rear. Provision may be made to adapt the color of the external masking layer (enamel notably, on face F2) accordingly.

In a preferred embodiment, the AMOLED screen —if opaque or slightly transparent preferably masked by the external masking layer, preferably on face F2—covers at most the entire peripheral zone visible by the driver (or copilot if AMOLED screen on the latter's side) in the (automotive) road vehicle windshield up to the edge of the transparent central vision zone and more precisely:
up to the upper edge of the transparent central vision zone if the AMOLED screen is arranged at the top in a horizontal manner on the driver's side (or copilot's side if AMOLED screen on the latter's side) along the driver's (or passenger's) side upper longitudinal edge
up to the lower edge of the transparent central vision zone if the AMOLED screen is arranged at the bottom in a horizontal manner on the driver's side (or copilot's side if AMOLED screen on the latter's side) along the driver's (or passenger's) side lower longitudinal edge
up to the upper edge of the transparent central vision zone if the AMOLED screen is arranged at the top in a horizontal or vertical manner in the central zone of the upper longitudinal edge
up to the left edge of the transparent central vision zone (respectively right) if the AMOLED screen is arranged in a vertical manner on the left preferably driver's side (respectively right preferably copilot's side) along the left lateral edge, preferably in the bottom part (lower half of the lateral edge) so as to be wider.

The same holds for said other AMOLED screen or screens—if opaque or slightly transparent preferably masked by the external masking layer, preferably on face F2-.

In the preferred configurations:
the AMOLED screen is alone in the visual comfort zone and of length W3 of at least 100 mm, serves for the view of the rear and for the lateral views of the vehicle, the AMOLED screen is arranged horizontally on the driver's side or arranged horizontally or vertically in the central zone of the upper longitudinal edge of the glazing or the AMOLED screen arranged horizontally on the driver's side is adjacent, the longest, to the one or two of said other AMOLED screens on the driver's side, arranged horizontally, optionally of smaller size than the AMOLED screen, the longest AMOLED screen is for the view of the rear and the other two screens are on either side of the AMOLED screen for the lateral views of the vehicle.

or the AMOLED screen arranged horizontally or vertically in the central zone of the upper longitudinal edge of the glazing is adjacent, the longest, to two of said other AMOLED screens, arranged horizontally if the AMOLED screen is arranged vertically or horizontally or two of said other AMOLED screens arranged vertically if the AMOLED screen is arranged vertically, optionally other AMOLED screens of smaller size than the AMOLED screen, the longest AMOLED screen is for the view of the rear and the other two screens are on either side of the AMOLED screen for the lateral views of the vehicle.

The upper, lower, lateral (left and right) edges (or limits) of the transparent central vision zone are notably defined by a regulating standard. For example for an automotive road vehicle windshield, this involves the restricted zone B defined according to European standard UN-ECE R43 annex 18, in particular page 133 and § 2.4. The upper limit of the transparent central vision zone is preferably defined on the basis of an angle between the horizontal and 7° from a reference point (the driver's eye, eye at the height Z with respect to the seat of the vehicle with Z=665 mm for a tall driver or Z=589 mm for a short driver.

From the edge concerned of the laminated glazing notably road vehicle windshield, the following distances are defined:

h1 distance between the upper edge and the upper limit of the peripheral zone of vision of the driver (or of the copilot if AMOLED screen on the latter's side) in the vehicle, preferably of at least 15 mm and even of at least 50 or 90 mm h'1 distance between the lower edge and the lower limit of the peripheral zone of vision of the driver (or of the copilot if AMOLED screen on the latter's side) in the vehicle preferably of at least 40 mm and even of at least 100 or 200 mm h4 distance between the lateral (left or right) edge and the lateral limit of the peripheral zone of vision of the driver (or of the copilot if AMOLED screen on the latter's side) in the vehicle preferably of at least 15 mm and even of at least 20 or 40 mm.

Away from the zone of the AMOLED screen (and/or of said other AMOLED screens) it is possible to form an external peripheral masking layer (on face F2) like enamel, from the lip up to h1, h'1, h4 while protruding beyond for example the (predetermined) vision zone by at most 2 cm as conventionally.

According to the invention, it is possible to increase in a way the width of the external masking layer so as to mask the AMOLED screen (and said other AMOLED screen or screens) and at the maximum up to the limits of the central transparency zone. The external masking is therefore possible from the limit of the restricted vision zone B up to the edge of the (first) glazing.

As a function of the edge concerned of the laminated glazing notably road vehicle windshield, the following distances are defined:

h2 distance between the upper edge and the upper limit of the central zone of transparency on the driver's side (or copilot's side if AMOLED screen on the latter's side), preferably of at least 120 mm and even of more than 150 mm or 200 mm or 220 mm, h'2 distance between the lower edge and the lower limit of the central transparency zone on the driver's side (or copilot's side if AMOLED screen on the latter's side) preferably of at least 120 mm and even of more than 150 mm or 300 mm, $H_a$ distance between the upper edge and the upper limit of the central transparency zone in the central part (for AMOLED screen in central position), preferably of at least 180 mm and even of at least 250 mm or 300 mm, h5 distance between the lateral (left or right) edge and the lateral limit of the central zone of transparency on the driver's side (or copilot's side if AMOLED screen on the latter's side) preferably of at least 80 mm and even of more than 120 or 150 mm.

The height h6 of the restricted zone B in the top position (between the potentially opaque zone and the most central zone A) can be from 60 mm to 90 mm. It can serve for a (fairly) transparent AMOLED screen (which may ascend into the potentially opaque zone). Preferably the external masking layer is higher than the AMOLED screen.

The height h'6 of the restricted zone B in the bottom position (between the potentially opaque zone and the central-most zone A) can be between 60 mm and 90 mm. It can serve for a (fairly) transparent AMOLED screen (which may descend into the potentially opaque zone). Preferably the external masking layer is lower than the AMOLED screen.

The external masking layer zone is preferably at least as large as the surface of the AMOLED screen, preferably slightly larger:
- for example by at least 5 mm on each side of the AMOLED screen
- and/or for example by at least 5 mm under the most central edge (bottom edge if position at the top of the AMOLED screen, bottom edge if position at the bottom of the AMOLED screen).

The external masking layer can be a solid zone (flat patch) extended by a discontinuous zone in the form of a network of patterns (geometric patterns, round, square, rectangular shape etc) preferably in gradation in the direction of the center of the laminated glazing (windshield). The gradation can be at most 15 mm and even at most 10 mm and at least 3 or 5 mm in width. The gradation can be in the zone of the lower longitudinal edge of at most 30 mm and even of at most 25 mm and of at least 10 or 15 mm in width. Preferably the AMOLED screen is not behind the gradation but behind the solid zone. At the limit only the gradation can protrude beyond the AMOLED screen.

The laminated glazing notably an (automotive) road vehicle windshield of rectangular shape can be:
- of width (horizontal dimension) Lp of at least 1200 mm and of at most 1850 mm and preferably from 1350 to 1550 mm.
- of height (vertical dimension) Hp of at least 800 mm and of at most 1400 mm and preferably from 950 to 1050 mm.

Preferably the AMOLED screen (in an automotive road vehicle windshield) is at least 80 mm by 120 mm.

Preferably the height H3 (and W3) of the AMOLED screen in an automotive road vehicle windshield is adjusted as a function of the standard in force.

Preferably the width W3 of the AMOLED screen in an automotive road vehicle windshield arranged horizontally in the top position (upper edge) is at least 100 mm and better at least 120 mm and even greater than 200 mm, than 350 mm, and even greater than or equal to 500 mm, notably or over the entire driver's side zone between a first visible lateral edge and the top central zone (and even all or part of the top central zone included) or the entire copilot's side zone between the second visible lateral edge and the top central zone (and even all or part of the top central zone included).

Preferably the height H3 of the AMOLED screen in an automotive road vehicle windshield arranged horizontally in the top position (upper edge) is at least 80 mm and better at least 100 mm.

Preferably the width W3 of the AMOLED screen in an automotive road vehicle windshield arranged horizontally in the bottom position (lower edge) is at least 100 mm and better at least 120 mm and even greater than 200 mm, than 350 mm and even greater than or equal to 500 mm, notably or over the entire driver's side zone between the visible lateral edge and a middle zone (and even all or part of the bottom central zone included) or the entire copilot's side zone between the second visible lateral edge and the bottom central zone (and even all or part of the bottom central zone included). Preferably the height H3 of the AMOLED screen in an automotive road vehicle windshield arranged horizontally in the bottom position (lower edge) is at least 80 mm and better at least 100 mm.

Preferably the width W3 of the AMOLED screen in an automotive road vehicle windshield arranged vertically in the top position (upper edge) in the central zone is at least 100 mm and better from at least 120 mm to 280 mm or even 300 mm.

Preferably the height H3 of the AMOLED screen in an automotive road vehicle windshield arranged vertically in the top position (upper edge) in the central zone is at least 80 mm and better at least 100 mm and even from at least 150 mm and up to 200 mm.

The connection element can be "wireless". A flexible (flat) connector according to the invention is however preferred for the transport of the power signals and/or data signals to one or more induction-based or capacitive etc. wireless connectors. The electrical connection element preferably of submicronic thickness E4 substantially equal to E2 and of thickness E'4 less than E4 beyond the lip of the second glazing (therefore the exterior part), is preferably curved and against or better fixed by gluing on face F4 without stretching as far as the display zone. The exterior part is preferably curved, the exterior part stretches along face F4 side, is against or better fixed by gluing on face F4 without stretching as far as the display zone.

The connection element is advantageously partially covered or shrouded, if appropriate, with any material so as to increase the thickness thereof to a value essentially equal to that of the AMOLED screen.

The connection element is preferably a flexible printed circuit ("fpc"). The connection element is preferably capable of addressing a large number of pixels.

The width of the flexible electrical connection element (notably the connecting part) can be less than or substantially equal to that of the AMOLED screen up to the edge of the laminated glazing, typically 50 mm in width for AMOLED widths (horizontal dimension) of at least 100 mm and even more than 150 mm. Large (wide) screens can have several flexible electrical connection elements preferably on one and the same edge of the AMOLED screen.

The distance between the termination of the electrical connection element and the lip of the second glazing is sufficiently large for this termination to be accessible during mounting or dismantling. The total length (unfolded) is adjusted for the connection element to be folded around the second glazing and fixed on face F4. From the exit of the interior glass, a distance of 20 to 150 mm is preferably envisaged.

In one embodiment, the electrical connection element (notably the connecting part) comprises:
  a flexible support preferably polymeric, transparent or otherwise (such as a PET etc) with first front face and first rear face, wires or preferably conducting tracks on the front or rear side,
  optionally electronic components such as transistors,
  the wires or tracks (and electronic components) being covered by an electrically insulating substance, such as a layer of resin or varnish (liquid deposition etc) or a transparent or non-transparent protective film (PET, polyimide etc) for example adhesive-coated.

The connecting part can be linked by any known means to the AMOLED screen: clipping, plug-in. Preferably the connecting part and the AMOLED screen are linked by one or more permanent (solid) links. A link between the connecting part and the AMOLED screen can be made on a technical edge of the AMOLED screen.

Preferably, a polyethylene terephthalate PET, a polyimide, a polyester, a poly(vinyl chloride) PVC, a polycarbonate, polyetheretherketone (PEEK), an acrylate, is chosen as flexible polymeric film, doing so for one at least of the following elements:
  the AMOLED screen (substrate, rear or front protective film: facade film etc),
  the electrical connection element notably the connecting part (substrate, rear or front protective film).

The second glazing preferably comprises a local notch. The connection element exits the lip of the second glazing via the notch of width preferably at least the width of the connection element and preferably at most the width of the AMOLED screen (not including the radii of the fitting).
The dimensions of the notch are therefore adapted:
  width of the notch greater than or equal to that of the connection element;
  depth of the notch greater than or equal to the thickness of the connection element so as to avoid it being visible from the outside in a case when the edge is evident. In practice the depth of the notch is preferably from 1.5 mm to 3 or even to 2 mm. The notch zone is preferably (substantially) devoid of lamination interlayer.

The lamination interlayer of polymeric substance is chosen from among polyvinylbutyral, ethylene—vinyl acetate, ionomer polyurethane or resin, alone or in mixtures of several varieties of one of them and/or of several of them; the term "varieties" refers here to variations of the amount of plasticizer, of branchings/linearity, average molecular weight of the molecules.

To ensure good water-tightness, it surrounds and is in contact with the AMOLED screen (rim and front and rear face) indeed even of the electrical connection element of flat connector type.

The lamination interlayer can itself be made of polyvinylbutyral (PVB), polyurethane (PU), ethylene/vinyl acetate copolymer (EVA), formed from one or more films, having for example a thickness of between 0.2 mm and 1.1 mm.

The surface of the lamination interlayer can be smaller than the surface of the laminated glazing, for example leaving a groove (frame-like or banner-like), which is free and therefore unlaminated.

The first glazing like the second glazing may be parallelepipedal, with rectangular, square main faces or sheets or even of any other shape (round, oval, polygonal).

The first and/or second glazing can (according to the esthetic result, the desired optical effect) be a clear glass (of luminous transmission LT greater than or equal to 90% for a thickness of 4 mm), for example a soda-lime standard composition glass such as Planilux® from the company Saint-Gobain Glass, or extra-clear glass (LT greater than or equal to 91.5% for a thickness of 4 mm), for example a soda-lime-silica glass with less than 0.05% of Fe III or of $Fe_2O_3$ such as Diamant® glass from Saint-Gobain Glass, or Optiwhite® glass from Pilkington, or B270® from Schott, or another composition described in document WO04/025334.

The glass of the first and/or second glazing can be neutral (no coloration), or (slightly) tinted notably gray or green, such as the TSA glass from the company Saint-Gobain Glass. The glass of the first and/or second glazing can have undergone a chemical or thermal treatment of the hardening, annealing type or a tempering (for better mechanical strength notably) or be semi-tempered.

The luminous transmission LT can be measured according to ISO standard 9050:2003 using the illuminant D65, and is the total transmission (notably integrated in the visible region and weighted by the sensitivity curve of the human eye), taking account both of direct transmission and of possible diffuse transmission, the measurement being made for example with the aid of a spectrophotometer furnished with an integrating sphere, the measurement at a given thickness thereafter being converted if appropriate to the reference thickness of 4 mm according to ISO standard 9050:2003.

For a laminated vehicle glazing notably windshield or lateral glazing, the LT can preferably be at least 70% and even at least 75% or 80%.

In one embodiment the first glazing is made of mineral glass and the second glazing is made of organic glass (such as PC, PMMA, cyclo-olefin copolymer (COC) or else polyethylene terephthalate (PET) optionally protected by a coating (on face F4). The exterior glazing can comprise functional thin layers on one or the other of its faces F1 and F2 or else both: it is possible to cite a photocatalytic self-cleaning or hydrophobic layer on face F1.

Preferably the laminated glazing forms a windshield of a road vehicle such as an automobile, a truck, with the first and second glazing cambered and even a PVB lamination interlayer. The camber of the first and second glazings (windshield) can be in one or more directions for example as described in document WO2010136702.

The AMOLED screen can preferably have a thickness of at most 0.8 mm, preferably at most equal to 0.7 mm, and in a particularly preferred manner at most equal to 0.6 mm and even of at least 0.15 mm.

The AMOLED screen preferably comprises a flexible support (polymeric, glass or indeed a metal) bearing a so-called lower electrode (often the anode) of an organic light-emitting system and an upper electrode, while including a matrix of thin-film transistors (TFT). Other functional elements or layers are possible notably:
  between the support and the lower electrode and in the form of a deposition or film: barrier layer (against oxygen, moisture etc),
  on the upper electrode and in the form of a deposition or film: protective layer (against oxygen, moisture etc), for example a deposition (varnish, shrouding, resin etc) and/or facade film (transparent polymeric film: PET etc).

More precisely the pixel preferably comprises side by side two or three of the following systems:
  an organic light-emitting system emitting in the red termed "R",
  an organic light-emitting system emitting in the green termed "G",
  an organic light-emitting system emitting in the blue termed "B",
  an organic light-emitting system emitting in the white termed "W"; in particular RGB, RWB, WBG, RWB, W, BG.

The number of pixels is at least 64×128. The emission is of top emitting type (emission away from the substrate). Front face is intended to mean the viewing face.

Provision may be made for means for modulating the power of the AMOLED screen according to at least two configurations: a configuration for nighttime vision, in which the power of the AMOLED screen is adjusted so that the luminance typically lies between about 10 and about 400 $Cd/m^2$ and a configuration for daytime vision, in which the power of the AMOLED screen is adjusted so that the luminance typically lies between about 10 and about 500 $Cd/m^2$. In daytime vision, it is also possible to adjust the luminance of the AMOLED screen as a function of the exterior illumination.

All information can be displayed on the AMOLED screen (notably on a windshield): exterior and interior atmospheric conditions, vision of the rear environment, vision of the left and right lateral environment (as already indicated), information related to the driving conditions and signposts, technical information relating to the transport vehicle.

The AMOLED screen in particular can have one or more of the following functions (which can be aggregated):
  central vision of the rear,
  display of driving aid information, in particular alerts, detection of obstacles,
  display of information (levels, operating state, state of wear, etc) on the characteristics of the vehicle (engine, wheels, brakes, headlights etc), in particular in case of alert (with a requested stop),
  display of information on the exterior environment: weather, distance to a service station (to an electricity point etc), to a town, to a highway exit,
  display of information on connectivity: access to the network (social network, Internet etc),
  operation in telephone mode: display of the speaker, of a person (police, medical setting) in case of emergency and/or of accident or of a risk situation.

The AMOLED screen and/or another AMOLED screen can also act as copilot side TV, or as operation in telephone mode: display of the speaker, of a person (police, medical setting) in case of emergency and/or of accident or of a risk situation.

The AMOLED screen can display several images as in a television
  main image (central vision of the rear etc)
  inlaid image(s) (lateral vision of the vehicle etc).

The AMOLED screen is notably rectangular or square.

On the front face side, at least one peripheral band termed the technical edge of the AMOLED screen (distinct zone from the active zone, for display) can be masked by a so-called internal masking layer, preferably of enamel, on the face F3 or F4 or by a masking element (opaque layer, film) on the front face. And/or the front surface of the connection element (the connecting part) can be masked by a (same) so-called internal masking layer, preferably of enamel, on the face F3 or F4 or by a masking element (opaque film) on the front surface.

The internal masking layer is optionally a flat patch with an opening revealing the display zone and of width less than or equal to the width of the external masking layer. The internal masking layer can form not only:
  a masking of the connecting part, opaque or slightly transparent,
  as well as a masking of the technical edges of the AMOLED screen, seen from the interior side of the glazing, notably of the windshield, and even, by protruding beyond the technical edge or edges, of the junction between the lamination interlayer and the AMOLED screen, which junction may comprise irregularities and flaws, (and even of the junction between the lamination interlayer and the connecting part).

The masking element can form part of a support film and/or protection such as polyethylene terephthalate (PET) of the AMOLED screen and of the connecting part. The opaque film can be stuck to the whole of the AMOLED screen and of the connecting part immediately when premounted with a view to its storage, or else form part of a film which has been stuck to this premounted assembly, from which film can then optionally be removed an undesired part precut before assembling the windshield.

The masking element (opaque film etc) can form not only:
a masking of the connecting part, opaque or slightly transparent,
as well as a masking of the technical edges of the AMOLED screen, seen from the interior side of the windshield,
and even, by protruding beyond the technical edge or edges, of the junction between the lamination interlayer and the AMOLED screen, which junction may comprise irregularities and flaws, (and even of the junction between the lamination interlayer and the connecting part).

The opaque film can also be an opacified extension of the transparent polymer material covering the AMOLED screen, that is to say be an integral part thereof.

The opaque film can also alternatively or cumulatively be an extension of the polymer material covering the connecting part, that is to say be an integral part thereof.

The internal masking layer or the masking element (the opaque film) can protrude beyond the technical edges by at least 0.1 mm and even by at most 5 mm or 2 mm.

The two embodiments with internal masking layer/masking element are not necessarily mutually exclusive, and it is possible to contemplate a masking of the technical edge of the AMOLED screen according to the first embodiment and a masking of the connection element (the connecting part) according to the second, or a double masking of the technical edge of the AMOLED screen or of the connection element according to both embodiments at the same time.

The function of the masking is to hide non-useful and unsightly parts of the device so that only the useful part thereof remains visible from the interior; any method suited to the nature of the substrate according to the first or second embodiment can be employed: printing such as ink jet, silk-screen, enamel as on the face F2 . . .

The internal masking layer can confine itself to masking the technical edge or edges and a part (at least the visible part) of the electrical connection element (of the connecting part), or even protrude optionally a little by at most 1 to 2 cm. The internal masking layer can be in the zone with the AMOLED screen of width less than or equal to that of the external masking so that the external masking is visible by transparency on either side of the AMOLED screen.

An internal and/or external masking layer can be a dark (black) enamel layer, but more broadly a layer of opaque paint or ink, or a tinted or painted polymer layer (e.g. printed PVB), for example polyethylene, polymethyl methacrylate (PMMA).

The external masking layer on face F2 and the internal one on F3 or F4 preferably consist of the same material and even enamel. It is preferred to have an enamel layer at least on face F2 and even on face F4.

The technical edge or edges of the AM-OLED screen and of optional other AMOLED screen(s) can be masked by a so-called interior masking element on the AMOLED screen under a dielectric protective layer or being an opaque zone of a dielectric protective layer, notably a resin. And/or the electrical connection element or elements are masked by said interior masking element or notably another adjacent one under a dielectric protective layer or being an opaque zone of a dielectric protective layer, notably a resin.

In order to limit the warming in the cabin or to limit the use of air conditioning, one of the glazings at least (preferably at least the first glazing) is preferably tinted.

The laminated glazing can comprise a layer which reflects or absorbs solar radiation termed a solar control layer, preferably on face F3 or indeed on face F2 of the second glazing (preferably clear). This electroconducting layer is transparent since it is in part in the clear window region.

The solar control layer can also serve as heating layer with a current infeed at the periphery.

In particular, a heating zone which is connected to at least two electroconducting busbar bars intended for connection to a voltage source in such a way that a current path for a heating current is formed between them.

The width of the busbars is preferably from 2 mm to 30 mm, in a particularly preferred manner from 4 mm to 20 mm and in particular from 10 mm to 20 mm.

A printed busbar preferably contains at least one metal, a metallic alloy, a metallic and/or carbon compound, in particular preferably a noble metal and, in particular, silver. The printing paste preferably contains metallic particles, metallic and/or carbon particles and, in particular particles of noble metal such as silver particles. The thickness of a printed busbar can preferably be from 5 μm to 40 μm, in a particularly preferred manner from 8 μm to 20 μm and more particularly preferably from 8 μm to 12 μm.

As a variant, however, a busbar can also be in the form of a strip of an electrically conducting sheet. The busbar then contains, for example, at least aluminum, copper, tinplated copper, gold, silver, zinc, tungsten and/or tin or alloys of these. The strip preferably has a thickness of 10 μm to 500 μm, in a particularly preferred manner of 30 μm to 300 μm.

The solar control and/or heating layer can comprise a stack of thin layers comprising at least one metallic functional layer such as silver (on F2 or preferably F3). The or each functional layer (silver) is disposed between dielectric layers.

The functional layers preferably contain at least one metal, for example, silver, gold, copper, nickel and chromium, or a metallic alloy. The functional layers in particular preferably contain at least 90% by weight of metal, in particular at least 99.9% by weight of metal. The functional layers can be made of metal for the metallic alloy. The functional layers contain in a particularly preferred manner silver or an alloy containing silver. The thickness of a functional layer (silver etc) is preferably from 5 nm to 50 nm, more preferentially from 8 nm to 25 nm. A dielectric layer contains at least one individual layer made of a dielectric material, for example, containing a nitride such as silicon nitride or an oxide such as aluminum oxide. The dielectric layer can however also contain a plurality of individual layers, for example, individual layers of a dielectric material, layers, smoothing layers, which corresponds to blocking layers and/or antireflection layers. The thickness of a dielectric layer is, for example, from 10 nm to 200 nm. This layer structure is generally obtained through a succession of deposition operations which are performed by a vacuum method such as magnetic cathodic sputtering, supported on-site.

The electroconducting layer is a layer (monolayer or multilayer and therefore stack) preferably of a total thickness of less than or equal to 2 µm, in a particularly preferred manner less than or equal to 1 µm.

The electroconducting layer can have a resistance of 0.4 ohms/square to 10 ohms/square of sheet and even of 0.5 ohms/square to 1 ohm/square, typically with onboard voltages of 12 V to 48 V or, in the case of electric vehicles, with typical onboard voltages of up to 500 V.

It is possible to aggregate electroconducting layer (in silver etc) on face F2 and/or F3. The electroconducting layer on face F3 is for example a stack marketed by the Applicant Company under the name Climacoat. For example, it can be covered directly with a masking of one or more technical edges of the AMOLED screen (detailed previously) and/or of the connecting part.

Alternatively it is possible to use an electroconducting layer on a support, preferably flexible transparent polymeric (polyethylene terephthalate termed PET etc) between the face F2 and F3 (preferably laminated by the interlayer rather than glued) so as to be a solar control, optionally heating, layer (with at least two busbars notably as aforementioned).

Hence, in one embodiment, the glazing (preferably the, notably road, vehicle windshield) comprises between the face F2 and the face F4, notably on the face F3 or on the face F4, a preferably transparent electroconducting layer or a set of electroconducting wires (metallic preferably) that are preferably transparent or invisible. And optionally opposite the display zone, the electroconducting layer is absent (removed, by laser ablation or any other means etc) notably by means of an opening of size greater than or equal to the display zone or the set of electroconducting wires are absent (removed) notably by means of an opening (elimination) of size greater than or equal to the display zone.

The electroconducting wires are advantageously implemented very thin such that they are only slightly or not at all detrimental to transparency, notably a thickness of less than or equal to 0.1 mm, in a particularly preferred manner of 0.02 mm to 0.04 mm, and in particular of 0.024 mm to 0.029 mm. The metallic wires preferably contain copper, tungsten, gold, silver or aluminum or alloys of at least two of these metals. The alloys can also contain molybdenum, rhenium, osmium, iridium, palladium or platinum. The electroconducting layer can cover at least 50% and even at least 70% or 80% or else at least 90% of the main face of the laminated glazing.

The electroconducting layer notably with said opening can be on the face F3 or on a flexible transparent polymeric film on the face F3 side (within the lamination interlayer preferably, closer to the face F3 than the AMOLED screen) and even be a solar control and/or heating layer which covers notably at least 50% and even at least 70% or 80% or else at least 90% of the face F3.

The opening (the absence of the electroconducting layer or electroconducting wires) makes it possible to remove the coloration due to the reflection of the electroconducting layer. It also increases the luminous transmission LT in this zone (in particular zone A, restricted zone B or peripheral zone with no masking background such as the enamel). This may be useful in particular for an AMOLED screen placed in the transparent central zone (restricted zone B notably) for example along the lower or upper longitudinal edge (notably in the aforementioned zones defined with the limits of zones). This (the opening) constitutes an invention per se that the AMOLED screen (alone or not) is or is not located in the visual comfort zone and/or displaying or not a plurality of items of information dynamically.

Preferably the second glazing clad with the electroconducting layer (with optional opening, for solar control and/or even heating) is a clear or extraclear glass, such as a Planiclear from the Applicant company (and the first glazing remains tinted).

BRIEF DESCRIPTION OF THE DRAWINGS

The present invention will be better understood and other details and advantageous characteristics of the invention will be apparent on reading the examples of laminated vehicle glazings according to the invention and illustrated by the following figures:

FIGS. 1 to 8 are each a face-on schematic view of a laminated windshield with AMOLED screen of an automotive vehicle, inside view

Figure 9:
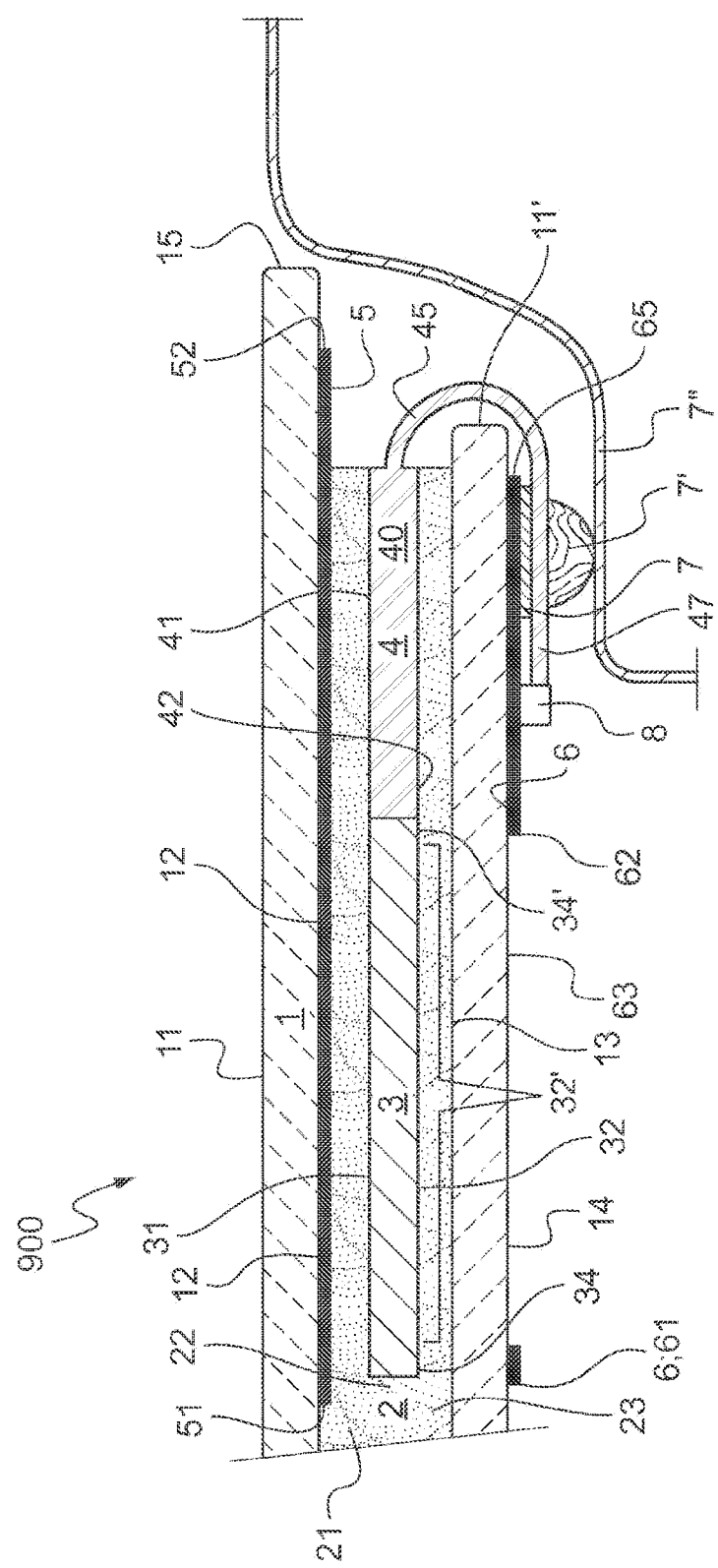
FIG. 9 is a sectional and partial schematic view of a windshield with AMOLED screen of an automotive vehicle, inside view

It is specified that out of concern for clarity the various elements of the objects represented are not necessarily reproduced to scale. For simplicity, the glazings are not represented cambered nor are the flexible elements in the lamination represented curved while adapting to this or these curvatures (in two dimensions) of glazing.

FIG. 1 is a face-on schematic view of a laminated windshield 100 with AMOLED screen of an automotive vehicle, inside view.

The windshield 100 comprises a clear view central zone (central part of the interior glazing 1' therefore face F4 side 14) and an external masking peripheral frame 5, bottom 15a and top 15b, left lateral 15c and right lateral 15d longitudinal edges, frame here masking the rear of the opaque or slightly transparent AMOLED screen 3 (not transparent enough to be in the clear window region especially the most central). The external masking layer 5, on face F2, thus hides from a view of the exterior of the vehicle the AMOLED screen 3 (and its connector not represented here, preferably in the laminate). The function of the enamel 5 is first to hide, viewed from the face F1, the glue bead fastening the final laminated glazing to the bodywork bay.

The AMOLED screen is arranged in a central position of the top longitudinal edge 15b in a horizontal manner and is rectangular. It is (all or part) in a so-called widened zone the width (vertical dimension) L1 of whose enamel is larger than the driver's side width L0 (for example on the left) serving for the conventional and even copilot side masking. For example, the horizontal dimension or width W3 is at least 120 mm and even up to 250 mm. The vertical dimension or height H3 is at least 75 mm and better still at least 100 mm and even at most 200 mm.

Here the AMOLED screen 3 is down at the bottom-most of the widened peripheral zone of enamel, central side upper longitudinal edge. Its bottom edge 34 is in proximity to or on the boundary of the enamel flat patch 51 (solid zone) rather than on the boundary of the optional zone with enamel patterns for example at most 15 mm in width. Its top edge 34' can be as high as possible (to the limit of the zone of vision in the cabin), typically at least 15 mm and better at least 70 mm. This depends on the design of the windshield (size, inclination, clear view desired by the maker).

The edges 53, 53' of the widened enamel zone 50 (central lower edge 51 lower than adjacent lower edge 51) can protrude beyond the lateral edges 33 and 33' for example by at most 2 cm or even 1 or 0.5 cm (limit of the solid zone). In the off state, the AMOLED screen is dark and is even barely if at all distinguishable from the enamel background 5 (protruding over the sides). It is possible to adapt the enamel color accordingly. Preferably the enamel is opaque and dark.

The AMOLED screen 3 is in a distinct peripheral zone from the transparent central zone termed zone A $Z_A$ (the most central and in two parts, quadrilateral-like) or of the restricted zone B $Z_b$ (dashed).

On the lit AMOLED screen 3, it is possible to see simultaneously (or not) information in three display zones:
 main zone: the central vision of the rear of the vehicle
 lateral zones 3a and 3b: lateral visions (exterior) of the vehicle.

FIG. 1' is a face-on schematic view of a laminated windshield 100' with AMOLED screen of an automotive vehicle, inside view.

The windshield 100' differs from the windshield 100 in that three other AMOLED screens, which are rectangular, are present:
 a first other screen 3' at the top and opposite the driver, along the longitudinal top edge 15b, arranged horizontally
 a second other screen 3a at the bottom and opposite the driver along the longitudinal bottom edge 15a, arranged horizontally
 a third other screen 3b at the bottom along the driver's side lateral edge 15c, arranged vertically. These three other screens are for example transparent, in the clear window region (are not masked by the external enamel layer 5) or are masked by the external enamel layer (up to the central transparency zone for example).

This FIG. 1' shows distances defining the limits of the vision zone of the driver (or copilot) and of the zone A $Z_A$ or of the restricted zone B $Z_B$.

The following pairs of distances are defined:
 h1 distance between the upper edge of the windshield and the upper limit F of the peripheral zone of vision of the driver or of the copilot in the vehicle, preferably of at least 15 mm and h2 distance between the upper edge and the upper limit F' of the central zone of transparency on the driver's or copilot's side, of at least 120 mm, the AMOLED screen 3' is between said limits F and F' as well as preferably the optional other AMOLED screen(s) in this zone
 h'1 distance between the lower edge of the windshield and the lower limit F1 of the peripheral zone of vision of the driver or of the copilot in the vehicle preferably of at least 40 mm and h'2 distance between the lower edge and the lower limit F'1 of the central transparency zone on the driver's or copilot's side of at least 120 mm, the AMOLED screen 3a is between said limits F1 and F'1 as well as preferably the optional other AMOLED screen(s) in this zone
 h4 distance between the lateral edge of the windshield and the lateral limit F2 of the peripheral zone of vision of the driver in the vehicle preferably of at least 15 mm and h5 distance between the lateral edge and the lateral limit F'2 of the central zone of transparency on the driver's side or the copilot's side of at least 80 mm, the AMOLED screen 3b is between said limits F2 and F'2 as well as preferably the optional other AMOLED screen(s) in this zone h1 distance between the upper edge of the windshield and the upper limit F3 of the peripheral zone of vision of the driver or of the copilot in the vehicle, preferably of at least 15 mm and $H_a$ distance between the upper edge and the upper limit F'3 of the central transparency zone in the central part, of at least 180 mm, the AMOLED screen is between said limits F3 and F'3 as well as preferably the optional other AMOLED screen(s) in this zone.

The limits of enamel L1, L1a, L1b are respectively substantially equal to h2, h'2, h5.

As a variant the AMOLED screen 3 is not masked via the rear (enamel strip narrower) in particular if very transparent.

Preferably the width of the top central zone wa is at most 280 mm and the width of the central zone w'a is 300 mm (at the level of h2).

The (automotive) road vehicle windshield of rectangular shape is:
 from 1350 to 1550 mm in width (horizontal dimension) Lp.
 from 950 to 1050 mm in height (vertical dimension) Hp.

By way of example we have h1=70 mm; h2=195 mm; Ha=270 mm; wa=280 mm; w'a=300 mm; h6=75 mm; h'6=75 mm; h'=85 mm; h=125 mm.

FIG. 2 is a face-on schematic view of a laminated windshield 200 with AMOLED screen of an automotive vehicle, inside view.

The windshield 200 differs from the windshield 100 in that the AMOLED screen 3 is central and two other AMOLED screens 3a and 3b, for example rectangular, are on either side notably adjoining or closely spaced. Hence, each is arranged vertically (higher than wide) so as to stand in the top central zone (at the lowest). The peripheral screens are for example of smaller widths w3a than that of the central AMOLED screen and of the same height H3 as it.

For example the central screen 3 is for the view of the rear and the other AMOLED screens 3a and 3b for the lateral views.

As a variant the AMOLED screens are not masked via the rear (enamel strip narrower) in particular if very transparent.

FIG. 3 is a face-on schematic view of a laminated windshield 300 with AMOLED screen of an automotive vehicle, inside view.

The windshield 300 differs from the windshield 100 in that the AMOLED screen 3 is central (height H3) and two other AMOLED screens 3a and 3b, for example rectangular, are on either side, notably adjoining or closely spaced, of height H3a less than H3. These two other screens 3a and 3b are arranged horizontally and therefore wider than high. The central AMOLED screen descends lower in the central zone. The enamel 5 has a notch with a curved part 53a.

For example the central AMOLED screen 3 is for the view of the rear and the other AMOLED screens 3a and 3b for the lateral views.

As a variant the AMOLED screens are not masked via the rear (enamel strip narrower) in particular if very transparent.

FIG. 4 is a face-on schematic view of a laminated windshield 400 with AMOLED screen of an automotive vehicle, inside view.

The windshield 400 differs from the windshield 100 in that the AMOLED screen 3 is placed opposite the driver and two other AMOLED screens 3a and 3b, for example rectangular, are on either side notably adjoining or closely spaced, for example of the same height H3 and not as long as W3. They are all arranged horizontally along the top edge 15b of the glazing opposite the driver.

For example the central AMOLED screen 3 is for the view of the rear and the other AMOLED screens 3a and 3b for the lateral views.

The enamel 5 is for example of constant width along the top edge of the glazing. It masks the screens.

As a variant the AMOLED screens are not masked via the rear (enamel strip narrower) in particular if very transparent.

FIG. 5 is a face-on schematic view of a laminated windshield 500 with AMOLED screen of an automotive vehicle, inside view.

The windshield 500 differs from the windshield 100 in that the AMOLED screen 3 is placed between two other AMOLED screens 3a and 3b, notably adjoining and both arranged horizontally along the top edge 15b of the glazing in the central zone, for example of the same height H3 and of length W3a not as long as W3.

For example the central AMOLED screen 3 is for the view of the rear and the other AMOLED screens 3a and 3b for the lateral views.

The enamel 5 is for example of constant width along the top edge of the glazing.

As a variant the AMOLED screens are not masked via the rear (enamel strip narrower) in particular if very transparent.

FIG. 6 is a face-on schematic view of a laminated windshield 600 with AMOLED screen of an automotive vehicle, inside view.

The windshield 600 differs from the windshield 100 in that the AMOLED screen 3 is placed at the top on the driver's side, is wider for example W3 at at least 300 mm or 500 mm and another AMOLED screen 3 is placed on the copilot's side (TV etc) and is for example at least 300 mm or 500 mm wide.

The enamel 5 is for example behind the AMOLED screens.

As a variant the AMOLED screens are not masked via the rear (enamel strip narrower) in particular if very transparent.

FIG. 7 is a face-on schematic view of a laminated windshield 700 with AMOLED screen of an automotive vehicle, inside view.

The windshield 700 differs from the windshield 100 in that the AMOLED screen 3 (arranged horizontally, rectangular) is placed on the driver's side at the top and two other AMOLED screens 3a and 3b (arranged horizontally, rectangular) notably not as high (H3a and H3b smaller than H3) are placed at the bottom on the driver's side for example symmetrically with respect to the center of the AMOLED screen.

The enamel 5 is for example behind the AMOLED screens.

The enamel 5 is for example of constant width along the bottom edge of the glazing.

FIG. 8 is a face-on schematic view of a laminated windshield 800 with AMOLED screen of an automotive vehicle, inside view.

The windshield 800 differs from the windshield 100 in that the AMOLED screen 3 and two other AMOLED screens 3a and 3b on either side (arranged horizontally, rectangular) are along the bottom edge 15a on the driver's side.

The enamel 5 is for example behind the AMOLED screens.

The enamel 5 is for example of constant width along the bottom edge of the glazing.

FIG. 9 is a sectional and partial schematic view of a windshield with AMOLED screen of an automotive vehicle, inside view.

The windshield 900 comprises:
- a first glazing 1, with a first main face 11 termed F1, intended to be on the outside of the vehicle, and a second opposite main face 12 termed F2, preferably of thickness E1 of at most 2.5 mm, in particular a preferably tinted soda-lime-silica float glass sheet, with a 2.1 mm thickness of glass such as a TSA glass from the Applicant company
- a lamination interlayer of polymeric substance 2, on the face F2 side, of thickness E2 preferably of at least 0.76 mm such as polyvinylbutyral (PVB)
- a second glazing 1', with a third main face 13 termed F3 on the lamination interlayer 2 side and a fourth opposite main face 14 termed F4, intended to be on the inside of the vehicle, preferably of thickness E'1 of at most 2.2 mm, in particular a soda-lime-silica float glass sheet with a 1.6 mm thickness of glass, for example tinted such as a TSA glass from the Applicant company,
- between the face F2 and the face F3 and within the lamination interlayer, an organic light-emitting diode-based viewing screen, comprising a set of pixels, termed a flexible AMOLED screen 3, the AMOLED screen comprising a zone of dynamic information display 32', of thickness E3 less than E2 and preferably subcentimetric, AMOLED screen having a front main face 32 oriented toward the face F3 and a rear face 31 oriented toward the face F2, the AMOLED screen is arranged peripherally,
- within the lamination interlayer an electrical connection element 4 of the AMOLED screen.

The AMOLED screen 3 is therefore sandwiched between the exterior glass sheet 1 and the interior glass sheet 1'. It exhibits a display zone 32' flanked by one or more technical edges (one, two, three or four) in narrow peripheral bands 34, 34' generally at least 0.5 mm in width (and less than 1 cm preferably). The AMOLED screen 3, flexible and extended directly toward an edge of the glazing, by the connection element 4 which is linked to it and extends outside the lamination.

It is supplied through an electrical connection element 4 of the AMOLED screen 3 which comprises:
- a flexible so-called connecting part 40 between the face F2 and the face F3 within the lamination interlayer with a front surface 42 on the face F3 side and a rear surface 41 on the face F2 side, of thickness E4 less than that E2 of the lamination interlayer linked to the AMOLED screen and extending the AMOLED screen in the direction of the lip of the second glazing 1',
- extended outside of the lip of the second glazing via a so-called exterior part 45 and curved and fixed by gluing (on face F4 without stretching as far as the display zone 32' via a part 47 terminated by its connector 8 in a zone accessible at the time of mounting/dismantling.

The connection element 4 is a flexible printed circuit (FPC) suitable for the implementation of 2560×1600 pixels (AMOLED screen). The FPC 4 could advantageously be of the same width as the AMOLED screen 3, so as to facilitate the insertion of the two elements into the lamination interlayer (set back a little with respect to the glazing edges).

The interior glass 1' comprises a notch 11'. The dimensions of the notch 11' are suited to the FPC 4:
- width of the notch 11' greater than or equal to that of the FPC 4;

depth of the notch 11' greater than or equal to the thickness of the FPC 4 preferably so as to prevent the FPC 4 being visible from the exterior in a case when the edge is evident.

In practice the depth of the notch 11' lies between 1.5 mm and 2 mm. The zone of the notch 11' is substantially devoid of lamination interlayer.

The AMOLED screen 3 has for example a thickness E3. The connecting part 40 can be less thick. It is optionally covered or shrouded with any material so as to increase (if necessary) the thickness E4 thereof to a value substantially equal to E3. If E4 is equal of 0.4 mm, E3 is from 0.38 to 0.40 mm. A central ply 22 of 0.38 mm is for example used for the lamination, with a reserve to house the AMOLED screen and the connecting part and two external plies 22, 23 of 0.17 mm or 0.38 mm. One of the external plies can be thicker for example 0.76 mm.

It is possible to have more than 3 plies (if insertion of a polymeric film such as a PET etc) or for more mechanical protection.

When the AMOLED screen is at most 0.15 mm or even 0.2 mm in thickness, it is optionally possible to eliminate the central ply during assembly.

The first glazing (exterior) 1 comprises an external masking layer 5 on face F2, opaque, of black enamel preferably,
  with an edge 51 toward the center of the windshield
  and an edge 52 on the lip side of the glazing 15 for example at a distance of at most 3 or 1 mm from the lip 15.

It hides not only the glue bead 7' of the trim 7" but also the AMOLED screen 3 (opaque or slightly transparent), the connecting part 40 and the off-glazing part 45 of the FPC and the part 47 and its connector 8.

The external masking layer 5 is preferably a solid zone (a flat patch) rather than a network of patterns. Beyond the edge 51 it can be extended by a network of patterns (made of the same substance) for example in gradation over a width of at most 15 mm and even 5 mm and even larger if the lip 15 is the lower longitudinal edge.

The second glazing 1' (interior) comprises on face F4 an internal masking layer 6 on face F4 (or as a variant F3), opaque, of black enamel preferably, with
  an edge 61 toward the center of the windshield
  an edge 65 on the notch side.

This internal masking layer 6 masks from the interior the entire surface of the connecting part 40 in particular that which is in the vision zone (away from zone with trim or optional casing). It can be wider than the connecting part.

This internal masking layer also masks from the interior the technical edges 34, 34' of the AMOLED screen. It can protrude for example by at most 10 mm opposite the lamination interlayer over the perimeter of the technical edges in order to mask lamination defects.

When the internal masking layer 6 is thus on the perimeter of the AMOLED screen 3, an opening 63 has therefore been formed (masking or post fabrication of the layer) revealing the display zone 32'.

It can also protrude further beyond the technical edges so that its width is (almost equal) to that of the external masking layer 5 on either side of the AMOLED screen (and/or of the connecting part).

The internal masking layer 6 is preferably a solid zone (a flat patch) rather than a network of patterns. Beyond the edge 61 it can be extended by a network of patterns (made of the same substance) for example in gradation over a width of at most 15 mm and even 5 mm and even larger if the lip of the notch 11' is the lower longitudinal edge.

As a variant, not shown, the layer 6 can be on face F3.

As a variant, not shown, the internal masking layer 6 is replaced with an opaque (opacified) film for example of polyethylene terephthalate (PET) that can be stuck to the whole of the AMOLED screen and of the FPC immediately when premounted with a view to its storage, or else form part of a film which has been stuck to this premounted assembly, from which film can then optionally be removed an undesired part precut before assembling the windshield.

The opaque film constitutes:
  a masking of the FPC, here opaque or slightly transparent, and of the junction between the PVB 22 (central part) and the AMOLED screen 3, which can comprise irregularities and flaws,
  as well as a masking of the technical edges 34 of the AMOLED screen 3, seen from the interior side of the windshield.

The opaque film can also be an opacified extension of the transparent polymer material covering the AMOLED screen, that is to say be an integral part thereof.

The opaque film can also alternatively or cumulatively be an extension of the polymer material covering the FPC, that is to say be an integral part thereof.

Moreover, as a variant, the face F3 is furnished with an electroconducting layer and optionally with a current infeed for the latter; this layer can consist of a stack which reflects solar radiation, in silver or other, or with a heating coating/stack furnished for this purpose with its current infeed. For example, it can be covered directly with a masking of the technical edge of the AMOLED screen mentioned previously.

Preferably, the second glazing covered with an electroconducting layer is a clear or extraclear glass, such as a Planiclear from the applicant company (and the first glazing is tinted).

For esthetic reasons the electroconducting layer can be absent at least in the zone opposite the display zone. This opening makes it possible to remove the coloration due to the reflection of this layer.

It also increases the LT in the case where there is no rear masking of the AMOLED screen (in a peripheral zone or in restricted zone B or even in zone A).

Figure 9A:
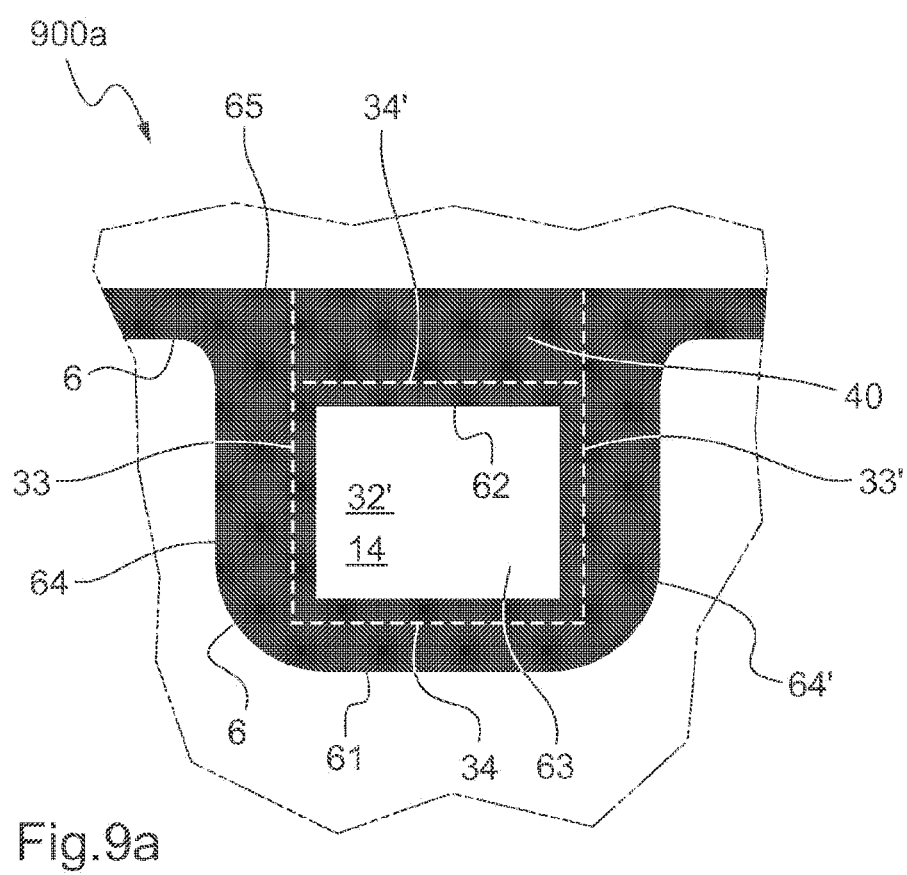
FIG. 9a is a face-on and detail schematic view of a windshield with AMOLED screen of an automotive vehicle, inside view.

FIG. 9a is a face-on and detail schematic view of a windshield with AMOLED screen of an automotive vehicle, inside view.

It illustrates the possible extent of the internal masking layer 6 on either side of the technical edges 33, 33', 34, 34' of the AMOLED screen here arranged horizontally along an upper longitudinal edge, in a central or non-central position.
  lateral edges 64 and 64' protruding preferably by at least 3 mm and
  bottom edge 61 protruding preferably by at least 3 mm.

The invention claimed is:

1. A laminated vehicle glazing, comprising:
  a first glazing, with a first main face, to be oriented on the outside of the vehicle, and a second opposite main face, the first glazing of thickness E1;
  a lamination interlayer of polymeric substance, on the second main face side, the lamination interlayer of thickness E2;
  a second glazing, with a third main face on the lamination interlayer side and a fourth opposite main face, to be oriented on the inside of the vehicle, the second glazing of thickness E'1, at least one of the first and second glazings being made of mineral glass, the second glazing having a notch extending along part of a lip of the second glazing;

between the second main face and the third main face, an organic light-emitting diode-based viewing screen, comprising a set of pixels, the organic light-emitting diode-based viewing screen comprising a zone of dynamic information display and having a thickness E3 less than E2, the organic light-emitting diode-based viewing screen having a front main face oriented toward the third main face and a rear face oriented toward the second main face, the organic light-emitting diode-based viewing screen being covered by a non-zero thickness of lamination interlayer, wherein the organic light-emitting diode-based viewing screen is flexible and is alone or adjacent with one or more other flexible organic light-emitting diode-based viewing screens arranged between the second main face and the third main face, said one or more other organic light-emitting diode-based viewing screens covered by a non-zero thickness of lamination interlayer, wherein the organic light-emitting diode-based viewing screen is configured to simultaneously display a plurality of different views from the vehicle dynamically independently of one another, and wherein the organic light-emitting diode-based viewing screen comprises an electrical connection element, with a flexible connecting part between the second main face and the third main face with a front surface on the third main face side and a rear surface on the second main face side, the flexible connecting part covered by a non-zero thickness of lamination interlayer, the electrical connection element being of thickness E4 less than E2, linked to the organic light-emitting diode-based viewing screen and extending the organic light-emitting diode-based viewing screen in a direction of the lip of the second glazing, the electrical connection element extending outside of the lip of the second glazing via an exterior part, said exterior part extending from a first end located between the first and the second glazing to a second end located against the fourth main face of the second glazing and within said notch along a thickness of the lip of the second glazing.

2. The laminated vehicle glazing as claimed in claim 1, wherein the organic light-emitting diode-based viewing screen is masked by an external periphery masking layer, opaque, between the second main face and the rear face of the organic light-emitting diode-based viewing screen, and the connecting part is also masked by the external masking layer or wherein the organic light-emitting diode-based viewing screen is in the clear window region.

3. The laminated vehicle glazing as claimed in claim 1, wherein said organic light-emitting diode-based viewing screen and said one or more other organic light-emitting diode-based viewing screens are spaced apart by at most 10 cm or adjoining or linked together.

4. The laminated vehicle glazing as claimed in claim 1, comprising said organic light-emitting diode-based viewing screen and two other organic light-emitting diode-based viewing screens, said three organic light-emitting diode-based viewing screens are on the driver's side or are in a central zone of an upper longitudinal edge of the laminated vehicle glazing.

5. The laminated vehicle glazing as claimed in claim 1, wherein the organic light-emitting diode-based viewing screen is in a peripheral zone of the laminated vehicle glazing and is situated between a lateral edge of the laminated vehicle glazing and a central zone of the laminated vehicle glazing.

6. The laminated vehicle glazing as claimed in claim 1, wherein:

the organic light-emitting diode-based viewing screen has a length W3 of at least 100 mm, the organic light-emitting diode-based viewing screen being adapted to provide a view of the rear and lateral views of the vehicle, the organic light-emitting diode-based viewing screen being arranged horizontally on the driver's side or arranged horizontally or vertically in a central zone of an upper longitudinal edge of the laminated vehicle glazing, or the organic light-emitting diode-based viewing screen is arranged horizontally on the driver's side and is adjacent, to the one or more other organic light-emitting diode-based viewing screens on the driver's side, which are arranged horizontally, the one or more other organic light-emitting diode-based viewing screens optionally of smaller size than the organic light-emitting diode-based viewing screen which is the longest, or the organic light-emitting diode-based viewing screen is arranged horizontally or vertically in the central zone of the upper longitudinal edge of the glazing and is adjacent to two of said one or more other organic light-emitting diode-based viewing screens, which are arranged horizontally if the organic light-emitting diode-based viewing screen is arranged vertically or horizontally or two of said one or more other organic light-emitting diode-based viewing screens are arranged vertically if the organic light-emitting diode-based viewing screen is arranged vertically.

7. The laminated vehicle glazing as claimed in claim 1, wherein the organic light-emitting diode-based viewing screen is arranged horizontally along a longitudinal edge of the laminated vehicle glazing, on the driver's side or copilot's side:

the organic light-emitting diode-based viewing screen is alone in a zone of the upper longitudinal edge on the driver's side or copilot's side, or the organic light-emitting diode-based viewing screen is adjacent to the one or more other organic light-emitting diode-based viewing screens, which are arranged horizontally and are optionally of smaller size than the organic light-emitting diode-based viewing.

8. The laminated vehicle glazing as claimed in claim 1, wherein:

the organic light-emitting diode-based viewing screen is arranged alone horizontally along a lower longitudinal edge of the driver's side glazing, or the one or more other organic light-emitting diode-based viewing screens are arranged horizontally along the lower longitudinal edge of the driver's side glazing, and the organic light-emitting diode-based viewing screen is arranged horizontally along an upper longitudinal edge of the laminated vehicle glazing.

9. The laminated vehicle glazing as claimed in claim 1, wherein, the organic light-emitting diode-based viewing screen is arranged in a peripheral zone of the laminated vehicle glazing and is situated in a central zone of an upper longitudinal edge of the glazing, the organic light-emitting diode-based viewing screen is optionally masked by an external masking layer on the second main face in a zone with the external masking layer, and;

the organic light-emitting diode-based viewing screen is the only one in the central zone and is arranged horizontally, or is adjacent, to one or two of said one or more other organic light-emitting diode-based viewing screens, which are arranged horizontally.

10. The laminated vehicle glazing as claimed in claim 1, wherein, the organic light-emitting diode-based viewing screen is arranged in a peripheral zone of the laminated vehicle glazing and is situated in a central zone of an upper longitudinal edge and;
the organic light-emitting diode-based viewing screen is arranged horizontally,
or the organic light-emitting diode-based viewing screen is arranged vertically and is adjacent with another of said one or more organic light-emitting diode-based viewing screens arranged vertically.

11. The laminated vehicle glazing as claimed in claim 1, comprising an external masking layer on the second main face behind the organic light-emitting diode-based viewing screen and the optional one or more other organic light-emitting diode-based viewing screens.

12. The laminated vehicle glazing as claimed in claim 1, wherein the organic light-emitting diode-based viewing screen covers at most an entire peripheral zone visible by the driver up to an edge of the transparent central vision zone.

13. The laminated vehicle glazing as claimed in claim 1, wherein technical edge or edges of the organic light-emitting diode-based viewing screen and of the optional one or more other organic light-emitting diode-based viewing screens are masked by an interior masking element on the organic light-emitting diode-based viewing screen, and/or the electrical connection element is masked by said interior masking element.

14. The laminated vehicle glazing as claimed in claim 1, wherein the electrical connection element is curved and is against or fixed by gluing on the fourth main face without stretching as far as the zone of dynamic information display.

15. The laminated vehicle glazing as claimed in claim 1, wherein the electrical connection element is a flexible printed circuit.

16. The laminated vehicle glazing as claimed in claim 1, wherein the electrical connection element screen and/or the connecting part has a thickness at most equal to 0.8 mm.

17. The laminated vehicle glazing as claimed in claim 1, wherein the second glazing bears on the third main face or the fourth main face an internal masking layer able to mask from the interior:
technical edge or edges of the electrical connection element screen and optional other electrical connection element screen(s) that is or are adjacent or on distinct longitudinal edges and to mask a junction zone between the lamination interlayer and the electrical connection element screen or optional other electrical connection element screen(s),
and/or the electrical connection element or elements of the electrical connection element screen and optional other electrical connection element screen(s) that is or are adjacent or on distinct longitudinal edges.

18. The laminated vehicle glazing as claimed in claim 1, wherein the organic light-emitting diode-based viewing screen is transparent with a luminous transmission of the glazing in the zone with the organic light-emitting diode-based viewing screen of at least 70%.

19. The laminated vehicle glazing as claimed in claim 1, comprising between the second main face and the fourth main face, an electroconducting layer or a set of electroconducting wires.

20. The laminated vehicle glazing as claimed in claim 19, wherein the electroconducting layer is on the third main face, or on a flexible transparent polymeric film on the third main face side, and is a solar control and/or heating layer and covers at least 50% of the third main face.

21. The laminated vehicle glazing as claimed in claim 1, wherein the laminated vehicle glazing a windshield of a road vehicle, with the first and second glazing cambered.

22. The laminated vehicle glazing as claimed in claim 1, wherein the connecting part is masked by a periphery masking layer, opaque, between the second main face and the connecting part.

23. A laminated vehicle glazing, comprising:
a first glazing, with a first main face, to be oriented on the outside of the vehicle, and a second opposite main face, the first glazing of thickness E1;
a lamination interlayer of polymeric substance, on the second main face side, the lamination interlayer of thickness E2;
a second glazing, with a third main face on the lamination interlayer side and a fourth opposite main face, to be oriented on the inside of the vehicle, the second glazing of thickness E'1, at least one of the first and second glazings being made of mineral glass, the second glazing having a notch extending along part of a lip of the second glazing;
between the second main face and the third main face, a first and a second organic light-emitting diode-based viewing screen, each comprising a set of pixels, each of the first and second organic light-emitting diode-based viewing screens comprising a zone of dynamic information display and having a thickness E3 less than E2, each of the first and second organic light-emitting diode-based viewing screens having a front main face oriented toward the third main face and a rear face oriented toward the second main face, each of the first and second organic light-emitting diode-based viewing screens being covered by a non-zero thickness of lamination interlayer, wherein each of the first and second organic light-emitting diode-based viewing screens is flexible and wherein the first and second organic light-emitting diode-based viewing screens are adjacent to each other and clustered together either in a zone adjacent a longitudinal edge of the laminated vehicle glazing or a zone adjacent a lateral edge of the laminated vehicle glazing, and
wherein at least one of the first and second organic light-emitting diode-based viewing screens comprises an electrical connection element, with a flexible connecting part between the second main face and the third main face with a front surface on the third main face side and a rear surface on the second main face side, the flexible connecting part covered by a non-zero thickness of lamination interlayer, the electrical connection element being of thickness E4 less than E2, linked to the at least one of the first and second organic light-emitting diode-based viewing screens and extending the at least one of the first and second organic light-emitting diode-based viewing screens in a direction of a lip of the second glazing the electrical connection element extending outside of the lip of the second glazing via an exterior part, said exterior part extending from a first end located between the first and the second glazing to a second end located against the fourth main face of the second glazing and within said notch along a thickness of the lip of the second glazing.

* * * * *